United States Patent
Kitamura

(10) Patent No.: US 10,579,333 B2
(45) Date of Patent: Mar. 3, 2020

(54) ARITHMETIC UNIT AND CONTROL METHOD FOR ARITHMETIC UNIT

(71) Applicant: FUJITSU LIMITED, Kawasaki-shi, Kanagawa (JP)

(72) Inventor: Kenichi Kitamura, Kawasaki (JP)

(73) Assignee: FUJITSU LIMITED, Kawasaki (JP)

(*) Notice: Subject to any disclaimer, the term of this patent is extended or adjusted under 35 U.S.C. 154(b) by 13 days.

(21) Appl. No.: 15/983,395

(22) Filed: May 18, 2018

(65) Prior Publication Data

US 2018/0336013 A1    Nov. 22, 2018

(30) Foreign Application Priority Data

May 22, 2017 (JP) ................. 2017-100529

(51) Int. Cl.
*G06F 7/487* (2006.01)
*G06F 7/499* (2006.01)

(52) U.S. Cl.
CPC ........ *G06F 7/4876* (2013.01); *G06F 7/49936* (2013.01)

(58) Field of Classification Search
CPC ... G06F 5/012; G06F 7/74; G06F 5/00; G06F 5/01; G06F 7/483; G06F 7/485; G06F 7/487; G06F 7/4876; G06F 7/499; G06F 7/4991; G06F 7/49915; G06F 7/49936; G06F 7/76; H03M 7/24
USPC .................................. 708/205, 211
See application file for complete search history.

(56) References Cited

U.S. PATENT DOCUMENTS

| | | | |
|---|---|---|---|
| 5,343,413 A | 8/1994 | Inoue | |
| 5,493,520 A * | 2/1996 | Schmookler | G06F 7/485 708/205 |
| 5,684,729 A | 11/1997 | Yamada et al. | |
| 5,993,051 A * | 11/1999 | Jiang | G06F 7/483 708/501 |
| 6,085,211 A | 7/2000 | Yoshioka | |
| 2007/0130242 A1* | 6/2007 | Tajiri | G06F 5/012 708/525 |

(Continued)

FOREIGN PATENT DOCUMENTS

| | | |
|---|---|---|
| JP | 6-75752 | 3/1994 |
| JP | 8-87399 | 4/1996 |
| JP | 10-289096 | 10/1998 |

*Primary Examiner* — Andrew Caldwell
*Assistant Examiner* — Emily E Larocque
(74) *Attorney, Agent, or Firm* — Staas & Halsey LLP

(57) ABSTRACT

An arithmetic unit includes a multiplier multiplying first and second inputs to output a multiplication result, an adder adding the third input to the multiplication result to output a multiplication addition result, a normalization shift circuit shifting the multiplication addition result left with a left shift amount, and a left shift amount prediction circuit. The adder includes a carry-save adder adding a first addition value and a first carry value to the third input and a full adder outputting the multiplication addition result. The left shift amount prediction circuit includes a leading zero count circuit generating a leading zero count, a leading one count circuit generating a leading one count, and a correction circuit correcting the leading one count to zero when NOR of respective least significant bits of the M upper order bits of the second addition value and the second carry value of the full adder is true.

11 Claims, 16 Drawing Sheets

(56) References Cited

U.S. PATENT DOCUMENTS

2011/0231460 A1* 9/2011 Ahmed ................ G06F 7/483
                                                    708/205
2014/0188968 A1* 7/2014 Kaul ...................... G06F 7/483
                                                    708/501

* cited by examiner

FIG.2

| S | E | F |

|  | DOUBLE PRECISION | SINGLE PRECISION | HALF PRECISION |
|---|---|---|---|
| S: SIGN PORTION | 1 | 1 | 1 |
| E: EXPONENT PORTION | 11 | 8 | 5 |
| F: FRACTION PORTION | 52 | 23 | 10 |

FRACTION: 1-bit HIDDEN BIT IS ADDED TO MOST SIGNIFICANT BIT OF FRACTION PORTION F
HIDDEN BIT: 1 FOR NORMALIZED NUMBER, 0 FOR SUBNORMAL NUMBER

FIG.3

```
                        [31]                                                    [0]
NORMALIZED NUMBER: 0001xxxxxxxxxxxxxxxxxxxxxxx00000
SUBNORMAL NUMBER : 0000xxxxxxxxxxxxxxxxxxxxxxxx00000
INTEGER          : xxxxxxxxxxxxxxxxxxxxxxxxxxxxxxxx
```

"x" DENOTES FRACTION PORTION

FIG.8

LZP[i] = (S[i]^C[i]) ^ (~S[i-1]&~C[i-1])
LOP[i] = (S[i]^C[i]) ^ (S[i-1]&C[i-1])

| | CA1 | [i] [i-1] | CA2 | [i] [i-1] | CA3 | [i] [i-1] |
|---|---|---|---|---|---|---|
| S | | 0  0 | | 0  0 | | 0  1 |
| C | | 0  0 | | 0  1 | | 0  1 |
| S[i]^C[i] | | 0 | | 0 | | 0 |
| CI[i] | | 0 | | 0/1 | | 1 |
| S[i]^C[i]^CI[i] | | 0 | | 0/1 | | 1 |
| ~S[i-1]&~C[i-1] | | 1 | | 0 | | 0 |
| S[i-1]&C[i-1] | | 0 | | 0 | | 1 |
| LZP[i] | | 1 | | <u>0</u> | | 0 |
| LOP[i] | | 0 | | <u>0</u> | | 1 |

| | CA4 | [i] [i-1] | CA5 | [i] [i-1] | CA6 | [i] [i-1] |
|---|---|---|---|---|---|---|
| S | | 0  0 | | 0  0 | | 0  1 |
| C | | 1  0 | | 1  1 | | 1  1 |
| S[i]^C[i] | | 1 | | 1 | | 1 |
| CI[i] | | 0 | | 0/1 | | 1 |
| S[i]^C[i]^CI[i] | | 1 | | 1/0 | | 0 |
| ~S[i-1]&~C[i-1] | | 1 | | 0 | | 0 |
| S[i-1]&C[i-1] | | 0 | | 0 | | 1 |
| LZP[i] | | 0 | | 1 | | 1 |
| LOP[i] | | 1 | | 1 | | 0 |

| | CA7 | [i] [i-1] | CA8 | [i] [i-1] | CA9 | [i] [i-1] |
|---|---|---|---|---|---|---|
| S | | 1  0 | | 1  0 | | 1  1 |
| C | | 1  0 | | 1  1 | | 1  1 |
| S[i]^C[i] | | 0 | | 0 | | 0 |
| CI[i] | | 0 | | 0/1 | | 1 |
| S[i]^C[i]^CI[i] | | 0 | | 0/1 | | 1 |
| ~S[i-1]&~C[i-1] | | 1 | | 0 | | 0 |
| S[i-1]&C[i-1] | | 0 | | 0 | | 1 |
| LZP[i] | | 1 | | <u>0</u> | | 0 |
| LOP[i] | | 0 | | <u>0</u> | | 1 |

| | CA1,7 | CA2,8 | CA3,9 | CA4 | CA5 | CA6 |
|---|---|---|---|---|---|---|
| S[i]^C[i] | 0 | 0 | 0 | 1 | 1 | 1 |
| CI[i] | 0 | 0/1 | 1 | 0 | 0/1 | 1 |
| S[i]^C[i]^CI[i] | 0 | 0/1 | 1 | 1 | 1/0 | 0 |
| ~S[i-1]&~C[i-1] | 1 | 0 | 0 | 1 | 0 | 0 |
| S[i-1]&C[i-1] | 0 | 0 | 1 | 0 | 0 | 1 |
| LZP[i] | 1 | <u>0</u> | 0 | 0 | 1 | 1 |
| LOP[i] | 0 | <u>0</u> | 1 | 1 | 1 | 0 |

FIG.9

LOP

[61] [60][59][58] --- [i+1] [i] [i-1] --- [2] [1] [0]

(1) [CA5] [CA5][CA5][CA5] --- [CA2/8][CA5] --- [CA2/8][CA5][CA5]   LOC = 3
     1    1   1   1          0      1          0      1   1

(2) [CA2/8] [CA5][CA5][CA5] --- [CA2/8][CA5] --- [CA2/8][CA5][CA5]   LOC = 3
      0     1   1   1          0      1          0      1   1

(3) [CA2/8][CA5][CA5] --- [CA2/8][CA5] --- [CA2/8][CA5][CA5]   LOC = 0
       0    1   1        0      1          0      1   1

FIG.10

LZP[i] = (S[i]^C[i]) ^ (~S[i-1]&~C[i-1])
LOP[i] = (S[i]^C[i]) ^ (S[i-1]&C[i-1])

|     | 60 59 | CA2<br>60 59 | 60 59 | CA5<br>60 59 | CA2<br>60 59 | 60 59 | CA5<br>60 59 | 60 59 |
|-----|-------|-------|-------|-------|-------|-------|-------|-------|
| S   | 0 0   | 0 1   | 1 0   | 1 1   | 0 0   | 0 1   | 1 0   | 1 1   |
| C   | 0 0   | 0 0   | 0 0   | 0 0   | 0 1   | 0 1   | 0 1   | 0 1   |
| CI  | 0     | 0     | 0     | 0     | 0     | 0     | 0     | 0     |
| LZP | 1     | 0 | 0     | 1 | 0 | 0     | 1 | 1     |
| LOP | 0     | 0     | 1     | 1     | 0     | 1     | 1     | 0     |
| RES | 0 0   | 0 1   | 1 0   | 1 1   | 0 1   | 1 0   | 1 1   | 0 0   |

|     | 60 59 | CA5<br>60 59 | 60 59 | CA8<br>60 59 | CA5<br>60 59 | 60 59 | CA8<br>60 59 | 60 59 |
|-----|-------|-------|-------|-------|-------|-------|-------|-------|
| S   | 0 0   | 0 1   | 1 0   | 1 1   | 0 0   | 0 1   | 1 0   | 1 1   |
| C   | 1 0   | 1 0   | 1 0   | 1 0   | 1 1   | 1 1   | 1 1   | 1 1   |
| CI  | 0     | 0     | 0     | 0     | 0     | 0     | 0     | 0     |
| LZP | 0     | 1 | 1     | 0 | 1 | 1     | 0 | 0     |
| LOP | 1     | 1     | 0     | 0     | 1     | 0     | 0     | 1     |
| RES | 1 0   | 1 1   | 0 0   | 0 1   | 1 1   | 0 0   | 0 1   | 1 0   |

|     | 60 59 | CA2<br>60 59 | 60 59 | CA5<br>60 59 | CA2<br>60 59 | 60 59 | CA5<br>60 59 | 60 59 |
|-----|-------|-------|-------|-------|-------|-------|-------|-------|
| S   | 0 0   | 0 1   | 1 0   | 1 1   | 0 0   | 0 1   | 1 0   | 1 1   |
| C   | 0 0   | 0 0   | 0 0   | 0 0   | 0 1   | 0 1   | 0 1   | 0 1   |
| CI  | 1     | 1     | 1     | 1     | 1     | 1     | 1     | 1     |
| LZP | 1     | 0     | 0     | 1     | 0     | 0     | 1     | 1     |
| LOP | 0     | 0 | 1     | 1 | 0 | 1     | 1 | 0     |
| RES | 0 1   | 1 0   | 1 1   | 0 0   | 1 0   | 1 1   | 0 0   | 0 1   |

|     | 60 59 | CA5<br>60 59 | 60 59 | CA8<br>60 59 | CA5<br>60 59 | 60 59 | CA8<br>60 59 | 60 59 |
|-----|-------|-------|-------|-------|-------|-------|-------|-------|
| S   | 0 0   | 0 1   | 1 0   | 1 1   | 0 0   | 0 1   | 1 0   | 1 1   |
| C   | 1 0   | 1 0   | 1 0   | 1 0   | 1 1   | 1 1   | 1 1   | 1 1   |
| CI  | 1     | 1     | 1     | 1     | 1     | 1     | 1     | 1     |
| LZP | 0     | 1     | 1     | 0     | 1     | 1     | 0     | 0     |
| LOP | 1     | 1 | 0     | 0 | 1 | 0     | 0 | 1     |
| RES | 1 1   | 0 0   | 0 1   | 1 0   | 0 0   | 0 1   | 1 0   | 1 1   |

FIG. 11

ROW 1, COLUMN 4

|     | 60 | 59 |
|-----|----|----|
| S   | 1  | 1  |
| C   | 0  | 0  |
| CI  |    | 1  |
| LZP | 1 |  |
| LOP | 1  |    |
| RES | 1  | 1  |

ROW 1, COLUMN 7

|     | 60 | 59 |
|-----|----|----|
| S   | 1  | 0  |
| C   | 0  | 1  |
| CI  |    | 0  |
| LZP | 1 |  |
| LOP | 1  |    |
| RES | 1  | 1  |

ROW 2, COLUMN 2

|     | 60 | 59 |
|-----|----|----|
| S   | 0  | 1  |
| C   | 1  | 0  |
| CI  |    | 0  |
| LZP | 1 |  |
| LOP | 1  |    |
| RES | 1  | 1  |

ROW 2, COLUMN 5

|     | 60 | 59 |
|-----|----|----|
| S   | 0  | 0  |
| C   | 1  | 1  |
| CI  |    | 0  |
| LZP | 1 |  |
| LOP | 1  |    |
| RES | 1  | 1  |

ROW 3, COLUMN 4

|     | 60 | 59 |
|-----|----|----|
| S   | 1  | 1  |
| C   | 0  | 0  |
| CI  |    | 1  |
| LZP | 1  |    |
| LOP | 1 | 0 |
| RES |    | 0  |

ROW 3, COLUMN 7

|     | 60 | 59 |
|-----|----|----|
| S   | 1  | 0  |
| C   | 0  | 1  |
| CI  |    | 1  |
| LZP | 1  |    |
| LOP | 1 | 0 |
| RES |    | 0  |

ROW 4, COLUMN 2

|     | 60 | 59 |
|-----|----|----|
| S   | 0  | 1  |
| C   | 1  | 0  |
| CI  |    | 1  |
| LZP | 1  |    |
| LOP | 1 | 0 |
| RES |    | 0  |

ROW 4, COLUMN 5

|     | 60 | 59 |
|-----|----|----|
| S   | 0  | 0  |
| C   | 1  | 1  |
| CI  |    | 1  |
| LZP | 1  |    |
| LOP | 1 | 0 |
| RES |    | 0  |

FIG.12

**(LZC) PATTERNS IN WHICH LZC IS SELECTED
PATTERNS IN WHICH LZP IS ERRONEOUS**

|     | 60 | 59 |     | 60 | 59 |     | 60 | 59 |     | 60 | 59 |
|-----|----|----|-----|----|----|-----|----|----|-----|----|----|
| S   | 1  | 1  |     | 1  | 0  |     | 0  | 1  |     | 0  | 0  |
| C   | 0  | 0  |     | 0  | 1  |     | 1  | 0  |     | 1  | 1  |
| CI  |    | 0  |     |    | 0  |     |    | 0  |     |    | 0  |
| LZP | 1 |   | 1 |   | 1 |   | 1 |   |
| LOP | 1  |    |     | 1  |    |     | 1  |    |     | 1  |    |
| RES | 1  | 1  |     | 1  | 1  |     | 1  | 1  |     | 1  | 1  |

**(LOC) PATTERNS IN WHICH LOC IS SELECTED
PATTERNS IN WHICH LOP IS ERRONEOUS**

|     | 60 | 59 |     | 60 | 59 |     | 60 | 59 |     | 60 | 59 |
|-----|----|----|-----|----|----|-----|----|----|-----|----|----|
| S   | 1  | 1  |     | 1  | 0  |     | 0  | 1  |     | 0  | 0  |
| C   | 0  | 0  |     | 0  | 1  |     | 1  | 0  |     | 1  | 1  |
| CI  |    | 1  |     |    | 1  |     |    | 1  |     |    | 1  |
| LZP | 1  |    |     | 1  |    |     | 1  |    |     | 1  |    |
| LOP | 1 |  | 1 |   | 1 |   | 1 |   |
| RES | 0  | 0  |     | 0  | 0  |     | 0  | 0  |     | 0  | 0  |

FIG.13

COMBINATIONS OF S [63:61] + C [63:61] = 110

|       | 63 62 61 | 63 62 61 | 63 62 61 | 63 62 61 |
|-------|----------|----------|----------|----------|
| S     | 1 1 0    | 1 0 1    | 1 0 0    | 0 1 1    |
| C     | 0 0 0    | 0 0 1    | 0 1 0    | 0 1 1    |
| S+C   | 1 1 0    | 1 1 0    | 1 1 0    | 1 1 0    |

|       | 63 62 61 | 63 62 61 | 63 62 61 | 63 62 61 |
|-------|----------|----------|----------|----------|
| S     | 0 1 0    | 0 0 1    | 0 0 0    | 1 1 1    |
| C     | 1 0 0    | 1 0 1    | 1 1 0    | 1 1 1    |
| S+C   | 1 1 0    | 1 1 0    | 1 1 0    | 1 1 0    |

FIG.14

CSA INPUT PATTERNS FROM WALLACE-TREE + RSFT, AND OUTPUTS THEREOF
(PATTERNS SATISFYING SUM [63:58] + CRY [63:58] = 000000 AND RSFT [63:61] = 111)

```
       P_a                P_b                P_c                P_d                P_e                P_f
       63626160           63626160           63626160           63626160           63626160           63626160
SUM    0 0 0 0            1 0 0 0            1 1 0 0            1 1 1 0            1 1 1 1            1 1 1 1
CRY    0 0 0 0            1 0 0 0            0 1 0 0            0 0 1 0            0 0 0 1            0 0 0 0
RSFT   1 1 1 x            1 1 1 x            1 1 1 x            1 1 1 x            1 1 1 x            1 1 1 x

S     1 1 1              1 1 1              0 1 1              0 0 1              0 0 0              1 1 0
 C     0 0 0              0 0 0              1 0 0              1 1 0              1 1 1              0 1 1

0 0 x
                                                                                                      0 1 1
```

P_f BROKEN DOWN FROM RSFT [60] = 0/1

```
       P_f0               P_f1
       63626160           63626160
SUM    1 1 1 1            1 1 1 1
CRY    0 0 0 0            0 0 0 0
RSFT   1 1 1 0            1 1 1 1

PATTERNS OBTAINED BY APPLYING PATTERN P_f0 IN FIG. 14 TO (LOC) IN FIG. 12

|      | 63 62 61 60 59 | 63 62 61 60 59 | 63 62 61 60 59 | 63 62 61 60 59 |
|------|----------------|----------------|----------------|----------------|
| SUM  | 1 1 1 1 1      | 1 1 1 1 1      | 1 1 1 1 1      | 1 1 1 1 1      |
| CRY  | 0 0 0 0 0      | 0 0 0 0 0      | 0 0 0 0 0      | 0 0 0 0 0      |
| RSFT | 1 1 1 1 0      | 1 1 1 1 0      | 1 1 1 1 0      | 1 1 1 1 0      |
| S    | 0 0 0 1 1      | 0 0 0 1 0      | 0 0 0 0 1      | 0 0 0 0 0      |
| C    | 1 1 0 0 0      | 1 1 0 0 1      | 1 1 0 1 0      | 1 1 0 1 1      |
| CI   | 1              | 1              | 1              | 1              |
| LOP  | 1 0 0      | 1 0 0      | 1 0 0      | 1 0 0      |
| RES  | 1 1 1 0 0      | 1 1 1 0 0      | 1 1 1 0 0      | 1 1 1 0 0      |

ARITHMETIC UNIT AND CONTROL METHOD FOR ARITHMETIC UNIT

CROSS-REFERENCE TO RELATED APPLICATION

This application is based upon and claims the benefit of priority of the prior Japanese Patent Application No. 2017-100529, filed on May 22, 2017, the entire contents of which are incorporated herein by reference.

FIELD

The invention relates to an arithmetic unit and a control method for the arithmetic unit.

BACKGROUND

A multiplier adder combining a multiplier that multiplies first and second inputs and an adder that adds or subtracts (referred together to "adds" hereafter) a third input to or from the multiplication result is available as an arithmetic unit. Meanwhile, a floating point multiplier adder implements a digit alignment operation to align decimal point positions of floating point inputs, and performs a normalization shift on a multiplication addition result.

A normalization shift is an operation to return a decimal point position of a multiplication addition result to a predetermined position by shifting the decimal point position left, and is performed by a normalization shift circuit for shifting a multiplication addition result left. When the point position of the multiplication addition result is known, a normalization shift amount, or in other words a left shift amount, can be determined, but when the normalization shift amount is determined after waiting for an addition result, a delay occurs in the operation time. Therefore, a normalization shift amount prediction circuit is provided to predict the normalization shift amount from the input into the adder and so on.

The normalization shift amount predicted by the normalization shift amount prediction circuit is not always the correct shift amount. The reason for this is that the normalization shift amount prediction circuit does not accurately take into account carry propagation from the least significant digit. When the predicted shift amount is smaller than the correct shift amount, the normalization shift circuit corrects the prediction error by implementing an additional left shift. When the predicted shift amount is larger than the correct shift amount, on the other hand, since the normalization shift circuit does not have a right shift function, a right shift correction circuit for shifting the output of the normalization shift circuit right is used.

Japanese Laid-open Patent Publication No. H06-75752, Japanese Laid-open Patent Publication No. H08-87399, and Japanese Laid-open Patent Publication No. H10-289096 describe normalization shifts implemented on an addition result from an adder or the like.

SUMMARY

However, providing a right shift correction circuit leads to an increase in circuit scale and a delay in the operation time, and is therefore undesirable.

In Japanese Patent Application Publication No. H06-75752, an input borrow propagation circuit is added to determine the presence of an error in the predicted shift amount of the normalization shift amount prediction circuit and correct the predicted shift amount. However, the borrow propagation circuit and the predicted shift amount correction circuit have large circuit scales, leading to problems such as an increase in circuit area, a delay in the operation time, and the generation of overheads.

One aspect of the present embodiment is an arithmetic unit comprising: a multiplier that converts a floating point format of a first input and a second input in a first operand and a second operand into an internal format in which M (where M is a plurality) most significant bits are set at 0 and N (where N is a plurality) lower order bits following the most significant bits constitute a fraction, and then multiplies the first input and the second input to output a multiplication result; an adder that converts a floating point format of a third input in a third operand into the internal format, and adds the third input to the multiplication result to output a multiplication addition result; a normalization shift circuit for shifting the multiplication addition result left on the basis of a left shift amount; and a left shift amount prediction circuit for predicting the left shift amount, wherein the adder includes: a carry-save adder that adds a first addition value and a first carry value, which together serve as the multiplication result, to the third input; and a full adder that adds together a second addition value and a second carry value output by the carry-save adder to output the multiplication addition result, and the left shift amount prediction circuit includes: a leading zero count circuit that generates a zero count determination value for each bit from the N lower order bits of the second addition value and the second carry value, and generates a leading zero count, which is a number of true zero count determination values occurring consecutively in descending order from an upper order bit side; a leading one count circuit that generates a one count determination value for each bit from the N lower order bits of the second addition value and the second carry value, and generates a leading one count, which is a number of true one count determination values occurring consecutively in descending order from the upper order bit side; and a correction circuit that corrects the leading one count to zero in a correction enabled state where a NOR of respective least significant bits of the M upper order bits of the second addition value and the second carry value is true.

According to the first aspect, the predicted value of the normalization shift amount is corrected with a small circuit scale, rendering an additional right shift correction circuit unneeded.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 2 is a diagram illustrating a format of the first, second, and third operands OP1, OP2, OP3, and a floating point number in the result register 21.

FIG. 3 is a diagram illustrating an internal format of the arithmetic unit.

FIG. 8 is a diagram illustrating logical operations executed by the zero count determination circuit (the LZP circuit) provided in the zero count circuit (the LZC circuit) 171 and the one count determination circuit (the LOP circuit) provided in the one count circuit (the LOC circuit) 172.

FIG. 9 is a diagram illustrating relationships between three examples of the one count determination value LOP and the one count LOC.

FIG. 10 is a diagram illustrating LOP and LZP according to all (32) combinations of S [60:59], C [60:59] in bits [60] and [59] and the carry-in CI [59] in bit [59], and the fully added value ADD1 (the RES of RESULT) obtained by the full adder 15. Here, the fully added value RES (=ADD1) is RES=S [60:59]+C [60:59]+CI [60:59].

FIG. 11 is a diagram illustrating (B) cases in which LZC and LOC are counted to be large (CA5), extracted from FIG. 10.

FIG. 12 is a diagram illustrating, respectively in an upper part and a lower part of the figure, a case in which an error may occur in LZC and a case in which an error may occur in LOC with respect to FIG. 11.

FIG. 13 is a diagram illustrating the eight patterns of S [63:61] and C [63:61] for satisfying S [63:61]+C [63:61]= 110.

FIG. 14 is a diagram illustrating patterns of the CSA inputs SUM, CRY and RSFT for satisfying Guarantee 4 and Guarantee 2, as described above.

FIG. 15 is a diagram in which the pattern P_f0 of FIG. 14 is applied to the four (LOC) patterns of FIG. 12.

DESCRIPTION OF EMBODIMENTS

First Embodiment

Multiplication Addition Circuit of First Embodiment

Figure 1:
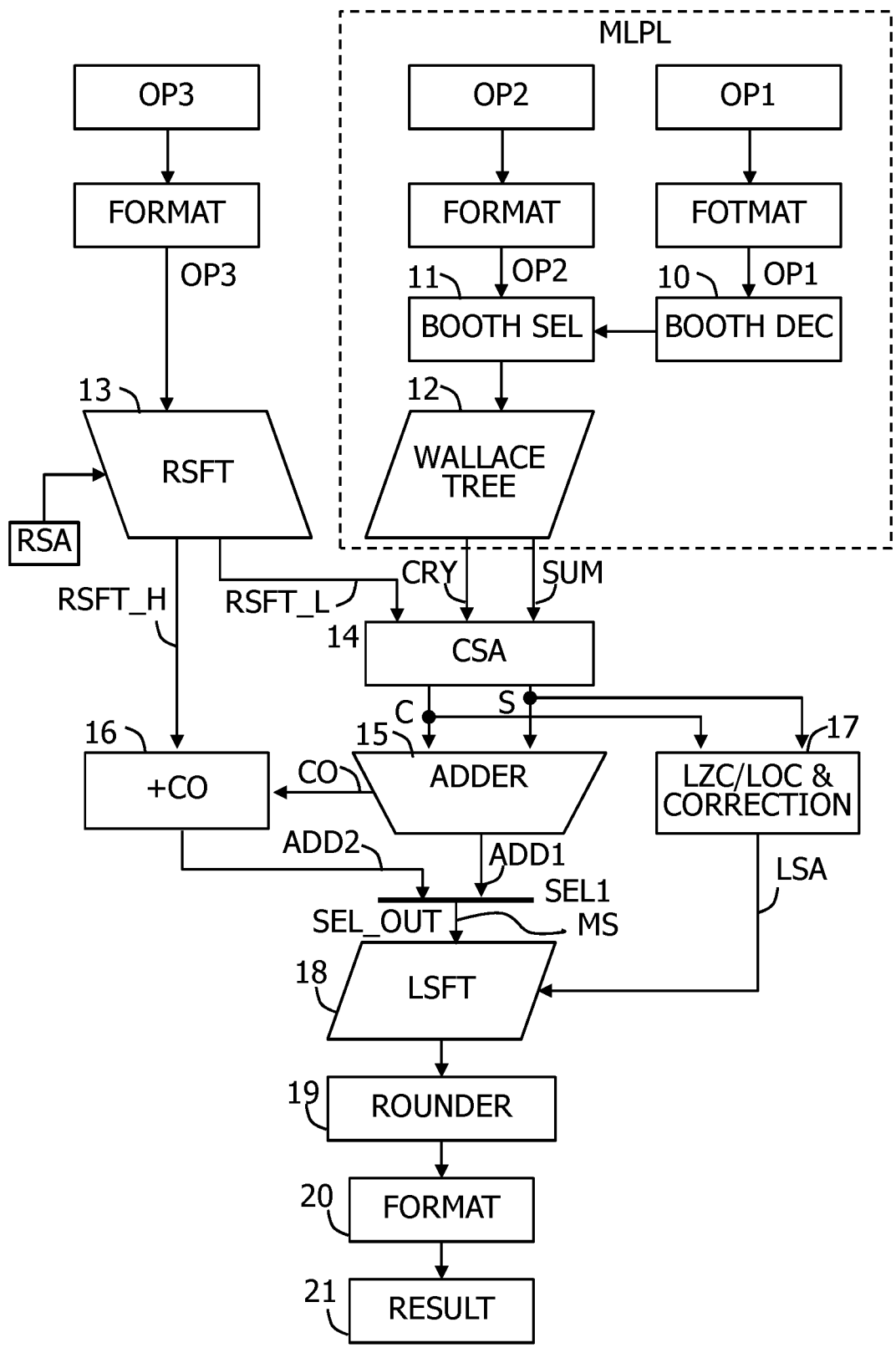
FIG. 1 is a diagram illustrating a multiplication addition circuit serving as an example of an arithmetic circuit according to a first embodiment.

FIG. 1 is a diagram illustrating a multiplication addition circuit serving as an example of an arithmetic unit or circuit according to a first embodiment. The multiplication addition circuit includes a multiplier MLPL for multiplying inputs constituted by first and second operands OP1, OP2, and addition circuits 14, 15 for adding an input constituted by a third operand OP3 to a multiplication result SUM+CRY. The inputs constituted by the three operands OP1, OP2, OP3 are floating point numbers or integers in an IEEE 754 format, for example, and are converted into a predetermined data format (an internal format in FIG. 3), to be described below, by respective format circuits FORMAT.

The multiplier MLPL is constituted by a Booth algorithm and a Wallace tree, for example. More specifically, the multiplier MLPL includes a Booth decoder 10 that decodes a multiplier of the operand OP1, a Booth selector 11 that selects partial products of a multiplicand of the operand OP2 corresponding to a decoded value obtained by the Booth decoder 10, and a Wallace tree 12 that adds the partial products of the multiplicand, selected by the Booth selector 11.

When a second order Booth algorithm, for example, is used, the Booth decoder 10 decodes each two bits of the multiplier of the operand OP1 at a time, whereupon the Booth selector 11 selects multiples of 0, ±1, and ±2 of the multiplicand (i.e. partial products of the multiplicand) of the operand OP2 on the basis of the decoded value.

The Wallace tree circuit 12 is formed by connecting carry-save adders (CSAs) in an inverted tree form, and a final stage CSA thereof outputs an addition SUM and a carry CRY.

Meanwhile, a right shift circuit 13 serving as an input shift circuit shifts an addend of the third operand OP3 right by a right shift amount RSA, whereby the digits of the addend are aligned with the outputs SUM, CRY of the multiplier. A lower order side output RSFT_L of the right shift circuit 13 is input into a CSA 14 together with the outputs SUM, CRY of the Wallace tree 12, and outputs S, C (S denotes a sum and C denotes a carry, but S and C are used to distinguish these outputs from SUM and CRY of the Booth tree) thereof are input into a full adder 15. Further, an upper order side output RSFT_H of the right shift circuit 13 and a carryout (a carry) CO from the full adder 15 are added together by a carry adder 16.

Furthermore, when the addend of the third operand OP3 is negative, the right shift circuit 13 converts the addend into a 2's complement. Moreover, the input shift circuit is not limited to a right shift circuit, and a left/right shift circuit capable of both left and right shifts may be employed instead.

A selector SEL1 selects either an upper order side or a lower order side of a bit string obtained by coupling an output ADD1 of the full adder 15 to an output ADD2 of the carry adder, and outputs a multiplication addition value MS. An operation of the selector SEL1 will be described below.

Meanwhile, the outputs S, C of the CSA 14, which are input into the full adder 15, are input into a left shift amount prediction circuit 17. The left shift amount prediction circuit 17 predicts a normalization shift amount (a left shift amount) LSA, which is either a number of consecutive leading "0"s (an LZC: Leading Zero Count) or a number of consecutive leading "1"s (an LOC: Leading One Count) of a fraction portion of the multiplication addition value MS, from the outputs S, C of the CSA 14. Further, the left shift amount prediction circuit includes an LOC correction circuit for correcting the predicted normalization shift amount.

A normalization shift circuit (a left shift circuit LSFT) 18 then shifts the multiplication addition value MS output by the selector SEL1 left by the normalization shift amount (the left shift amount) LSA. As will be described below, when the selector SEL1 selects the lower order side, the normalization shift circuit 18 shifts the multiplication addition value MS left on the basis of the normalization shift amount LSA predicted by the left shift amount prediction circuit, and when the selector SEL1 selects the upper order side, the normalization shift circuit 18 shifts the multiplication addition value MS left by an identical shift amount to the right shift amount RSA. Hence, the predicted shift amount LSA predicted by the left shift amount prediction circuit is used only when the selector SEL1 selects the lower order side.

Finally, the output of the normalization shift circuit 18 is rounded by a rounding circuit 19, converted by a formatting circuit 20 into the IEEE 754 format from the predetermined format used in the arithmetic unit, and stored in a result register 21.

FIG. 2 is a diagram illustrating a format of a floating point number in the first, second, and third operands OP1, OP2, OP3, and the result register 21. This format is compliant with IEEE 754. The IEEE 754 format is constituted by a sign portion S (Sign), an exponent portion E (Exponent), and a fraction portion F (Fraction), in order from the most significant bit. In the case of single precision, the sign portion S is 1 bit, the exponent portion E is 8 bits, and the fraction portion F is 23 bits. In the case of double precision, S is 1 bit, E is 11 bits, and F is 52 bits. Further, in the case of half precision, S is 1 bit, E is 5 bits, and F is 10 bits. A hidden bit has been omitted from the fraction portion F. Further, the hidden bit is "1" in the case of a normalized number, and "0" in the case of a subnormal number (a minimum value).

FIG. 3 is a diagram illustrating an internal format of the arithmetic unit. The internal format of the arithmetic unit is a data format of the input of the Wallace tree 12 and the right shift circuit 13. FIG. 3 depicts an example of single precision. A normalized number and a subnormal number each have: "0" in the M (three) most significant bits [31:29]; a fraction portion obtained by adding a hidden bit to the most significant digit of the N (24) lower order bits [28:5] following the M most significant bits; and "0" in bits [4:0]. The "0"s in [31:29] and [4:0] are merely padding for realizing a 32 bit width. Hence, in the case of a floating point number, the fraction, which is substantial operation subject, is positioned in bits [28:5]. For an integer, meanwhile, bits [31:0] all serve as the fraction portion.

The LOC correction circuit provided in the left shift amount prediction circuit 17 according to this embodiment is configured on the basis of the internal format illustrated in FIG. 3. This point will be described in more detail below.

Figure 4:
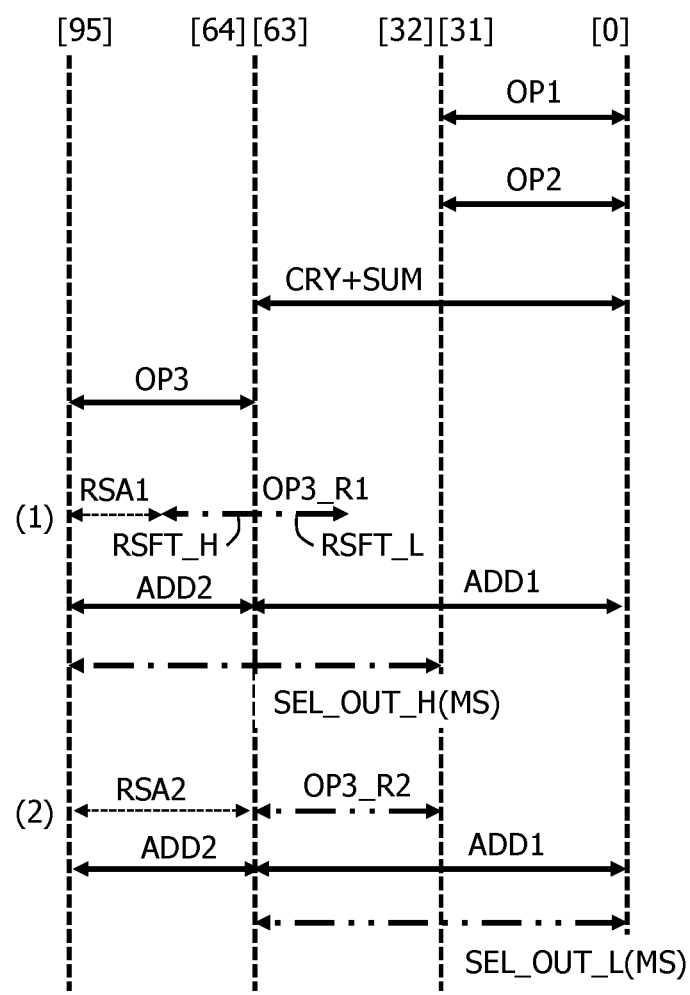
FIG. 4 is a diagram illustrating digits of the respective types of data in the multiplier/adder of FIG. 1.

FIG. 4 is a diagram illustrating bit positions of the respective data in the multiplier/adder of FIG. 1. It is assumed that the bit width of the data of the respective operands OP1, OP2, OP3 is single precision, i.e. 32 bits. The respective multipliers of the first and second operands OP1 and OP2 serving as the input of the multiplier MLPL are constituted by [31:0] bit data. The sum SUM+CRY of the outputs SUM, CRY of the Wallace tree 12, which serves as a multiplication value, is constituted by [63:0] bit data.

Further, the addend of the third operand OP3 serving as the input of the adder is constituted by [95:64] bit data. The right shift circuit 13 shifts the data of the third operand OP3 right in accordance with the right shift amount RSA determined on the basis of the exponent bits of the floating points of the operands OP1, OP2, OP3. FIG. 4 depicts (1) right-shifted data OP3_R1 obtained with a right shift amount RSA1 (<32 bits), and (2) right-shifted data OP3_R2 obtained with a right shift amount RSA2 (≥32 bits).

In the case of (1), the right-shifted data OP3_R1 are separated into [95:64] and [63:32], whereupon the lower order side data RSFT_L of the right-shifted data OP3_R1, i.e. the data from the bit 63 downward, are input into the CSA 14 and the upper order side data RSFT_H from bit 64 upward are input into the carry adder 16. The output ADD1 of the full adder 15 and the output ADD2 of the carry adder 16 are then input into the selector SEL1 as [63:0] bit data and [95:64] bit data, respectively. In this case, the selector SEL1 selects [95:32] bit data SEL_OUT_H, i.e. the upper order 64 bits, and outputs the selected data as the multiplication addition value MS.

In the case of (2), the right-shifted data OP3_R2 are right-shifted to within [63:0] and input into the CSA 14 as the lower order side data RSFT_L. Meanwhile, the outputs CRY, SUM of the Wallace tree circuit 12 are input into the CSA 14. The CSA 14 then adds the data OP3_R2 to the outputs CRY, SUM of the Wallace tree circuit, whereupon the full adder 15 adds together the outputs S, C of the CSA 14, and the resulting output ADD1 is constituted by [63:0] bit data. In this case, the data ADD2 output by the carry adder 16 is constituted entirely by 0s. Accordingly, the selector SEL1 selects [63:0] bit data SEL_OUT_L, and outputs the selected data as the multiplication addition value MS.

As is evident from FIG. 4, (1) when the selector SEL1 selects the upper order side SEL_OUT_H, the normalization shift circuit 18 performs a left shift by an equal shift amount to the right shift amount RSA. (2) When the selector SEL1 selects the lower order side SEL_OUT_L, on the other hand, the normalization shift circuit 18 performs a left shift in accordance with the left shift amount LSA predicted by the left shift amount prediction circuit 17.

Left Shift Amount Prediction Circuit 17

Figure 5:
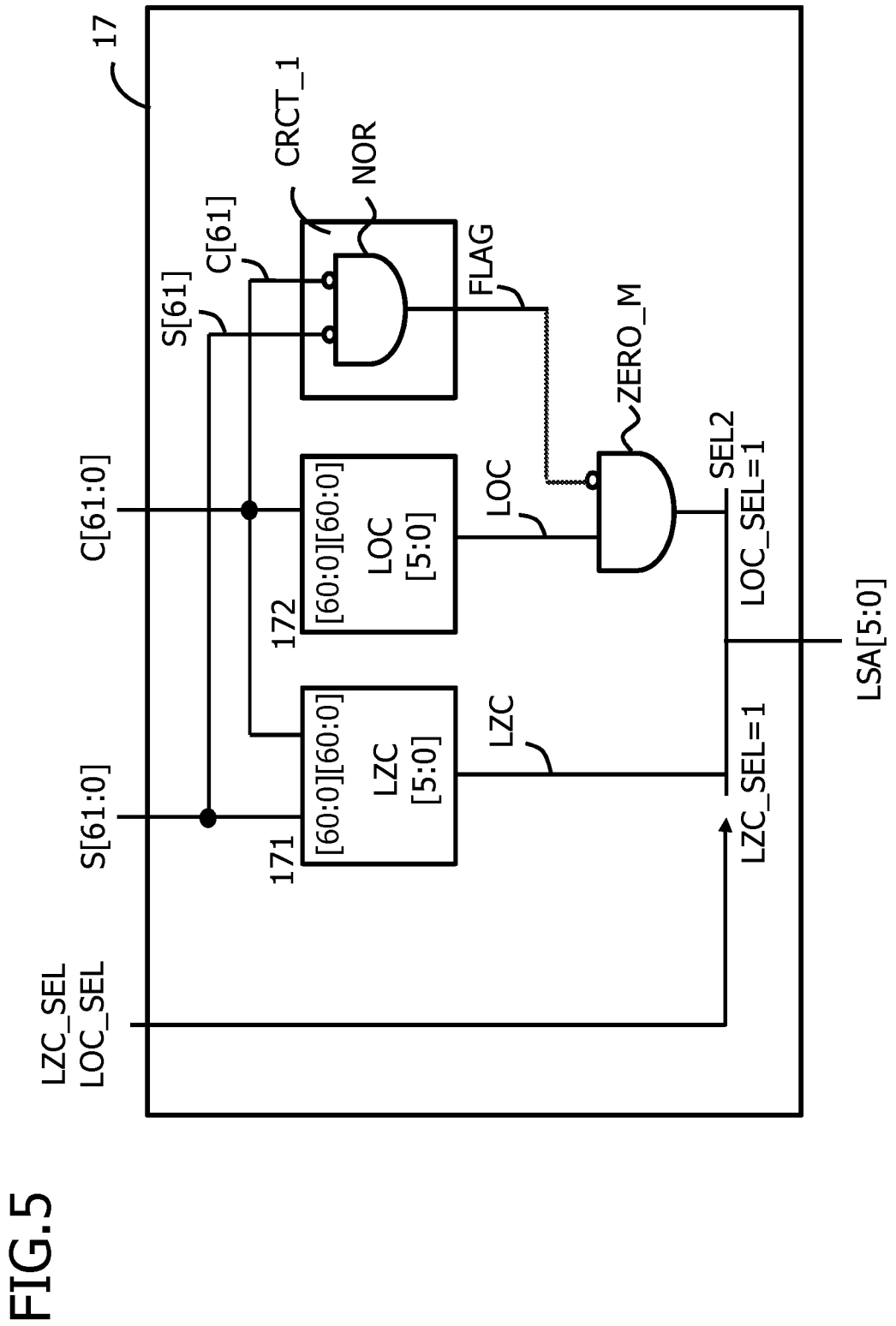
FIG. 5 is a diagram illustrating an example configuration of the left shift amount prediction circuit 17 according to the first embodiment.

FIG. 5 is a diagram illustrating an example configuration of the left shift amount prediction circuit 17 according to the first embodiment. An addition or sum value S [61:0] and a carry value C [61:0] serving as the outputs of the CSA 14 are input into the left shift amount prediction circuit. An LZC circuit 171 that counts the number of leading zeros "0" artificially adds S [60:0] and C [60:0] while completely ignoring carry propagation from the least significant digit, counts the number of leading zeros of the artificial addition result for each digit, and outputs a leading zero count LZC [5:0]. A specific arithmetic expression will be described below.

Similarly, an LOC circuit 172 that counts the number of leading ones "1" artificially adds S [60:0] and C [60:0] while completely ignoring carry propagation from the least significant digit, counts the number of leading ones of the artificial addition result for each digit, and outputs a leading one count LOC [5:0]. A specific arithmetic expression for this operation will also be described below.

Further, the left shift amount prediction circuit 17 includes a correction determination circuit CRCT_1. The correction determination circuit CRCT_1 generates a correction flag FLAG indicating an error in LOC [5:0] predicted from S [61] and C [61], for example, whereupon a leading one count correction circuit ZERO_M corrects all bits of the one count prediction values LOC [5:0] to zero as a basis of the correction flag FLAG.

The left shift amount prediction circuit also includes a selector SEL2. The selector SEL2 selects LZC [5:0] when a selection signal LZC_SEL for selecting LZC is true (LZC_SEL=1), selects LOC [5:0] when a selection signal LOC_SEL for selecting LOC is true (LOC_SEL=1), and outputs the selected value as the left shift amount LSA [5:0]. The left shift amount LSA is input into the normalization shift circuit LSFT 18.

Figure 6:
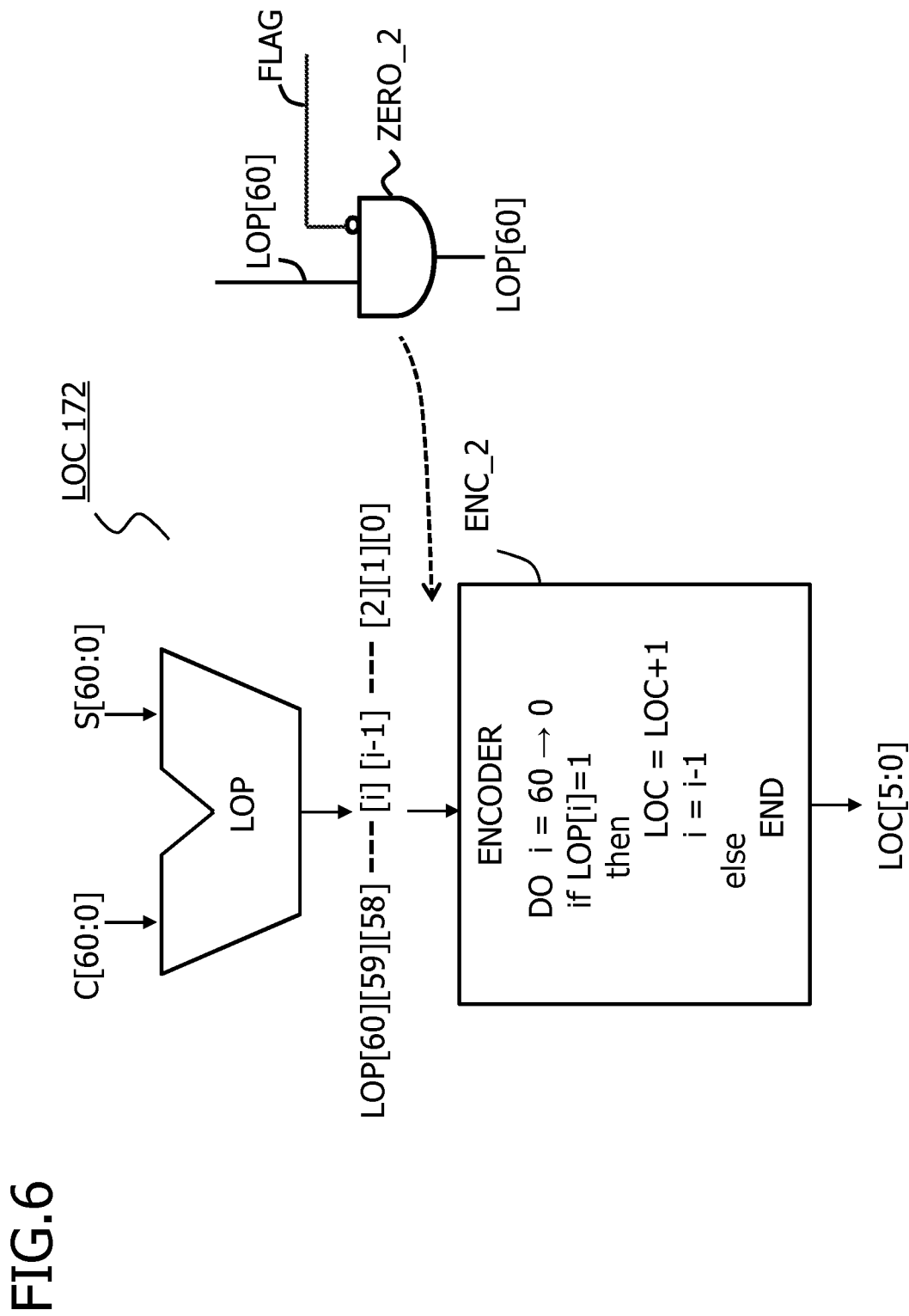
FIG. 6 is a diagram illustrating a configuration of the one count circuit (the LOC circuit).

FIG. 6 is a diagram illustrating a configuration of the leading one count circuit (the LOC circuit). The LOC circuit 172 includes a one count determination circuit (an LOP circuit) LOP and an encoder ENC_2. The LOP circuit artificially adds S [60:0] and C [60:0] while completely ignoring carry propagation from the least significant digit, and on the basis of the artificial addition result for each digit, generates for each digit a one count determination value (an LOP value) indicating whether or not to count up the leading one counter LOC. In other words, the LOP value is LOP

[60:0], and for each digit i, LOP [i]=1 indicates that the leading one counter LOC is to be counted up, while LOP [i]=0 indicates that the leading one counter LOC is not to be counted up.

Meanwhile, the encoder ENC_2 executes the operation illustrated in the figure in descending order from bit 60 to bit 0 of the LOP value LOP [60:0] generated by the LOP. More specifically, in order from bit 60, the encoder ENC_2 counts up the leading one counter LOC, i.e. LOC=LOC+1, when LOP [i]=1, and then decrements i (i=i−1), and terminates the operation when LOP [i]=0. In other words, the encoder ENC_2 counts consecutive instances of LOP [i]=1 from bit 60. Moreover, the LOC 172 counts ones in the value C[60:0]+S[60:0], and therefore predicts the normalization shift amount in a case where the multiplication addition value C+S is negative.

Figure 7:
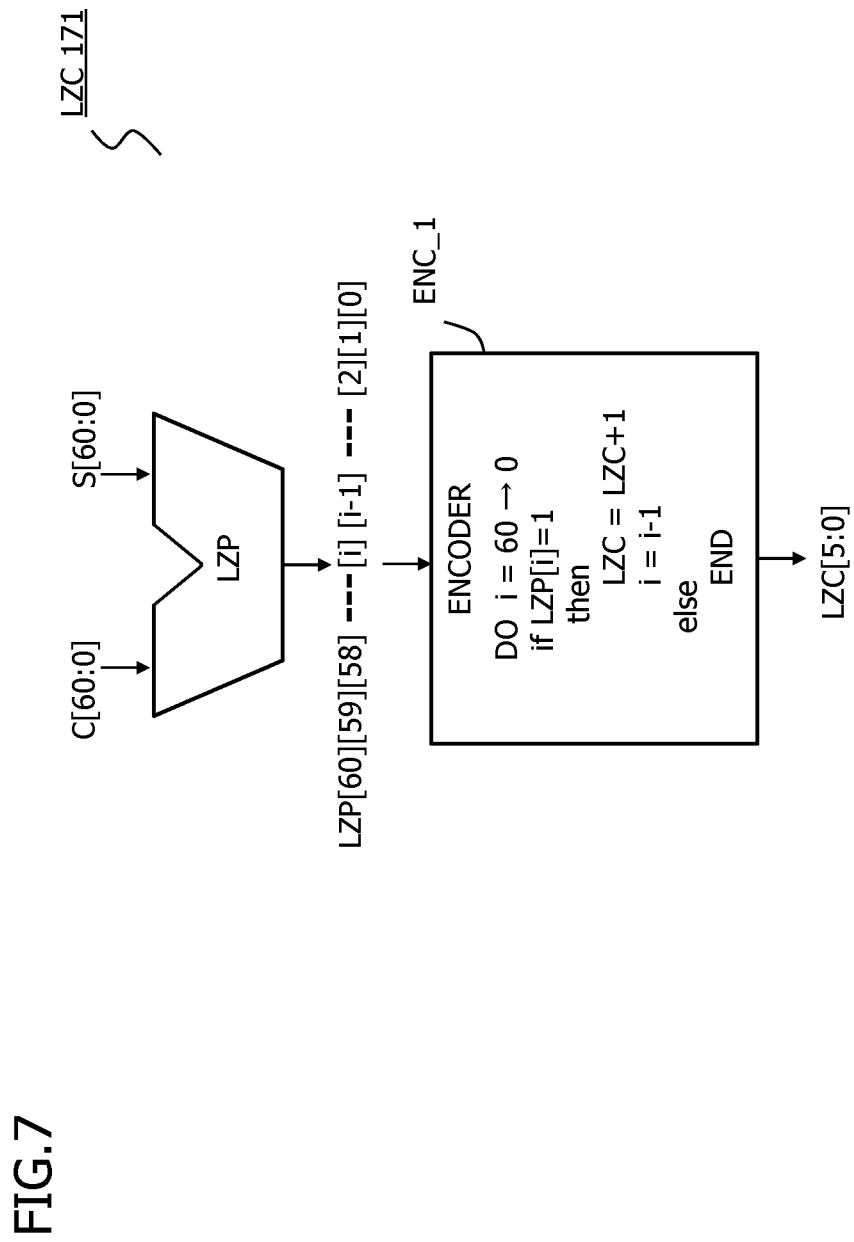
FIG. 7 is a diagram illustrating a configuration of the LZC circuit.

FIG. 7 is a diagram illustrating a configuration of the LZC circuit. The LZC circuit 171 includes a zero count determination circuit LZP and an encoder ENC_1. The circuit LZP artificially adds S [60:0] and C [60:0] while completely ignoring carry propagation from the least significant digit, and on the basis of the artificial addition result for each digit, generates for each digit an LZP value indicating whether or not to count up the leading zero counter LZC. In other words, the LZP value is LZP [60:0], and for each digit i, LZP [i]=1 indicates that the leading zero counter LZC is to be counted up, while LZP [i]=0 indicates that the leading zero counter LZC is not to be counted up.

Meanwhile, the encoder ENC_1 executes the operation illustrated in the figure in descending order from bit 60 to bit 0 of the LZP value LZP [60:0] generated by the LZP. More specifically, in order from bit 60, the encoder ENC_1 counts up the leading zero counter LZC, i.e. LZC=LZC+1, when LZP [i]=1, and then decrements i (i=i−1), and terminates the arithmetic when LZP [i]=0. In other words, the encoder ENC_1 counts LZP [i]=1 consecutively from the bit 60. Moreover, the LZC 171 counts zeros, and therefore predicts the normalization shift amount in a case where the multiplication addition value S+C is positive.

LZP and LOP

FIG. 8 is a diagram illustrating logical operations executed by the zero count determination circuit (the LZP circuit) provided in the leading zero count circuit (the LZC circuit) 171 and the one count determination circuit (the LOP circuit) provided in the leading one count circuit (the LOC circuit) 172. Logical expressions of the LZP circuit and the LOP circuit are as follows.

$$LZP[i]=(S[i] \hat{} C[i]) \hat{} (\sim S[i-1] \& \sim C[i-1]) \quad \text{Expression 1}$$

$$LOP[i]=(S[i] \hat{} C[i]) \hat{} (S[i-1] \& C[i-1]) \quad \text{Expression 2}$$

Here, S and C are the outputs of the CSA 14, while ˆ denotes an EOR, ˜ denotes a NOT, and & denotes an AND.

To count LZC and LOC accurately, the leading zeros "0" or the leading ones "1" need to be counted according to results obtained by fully adding the inputs S [60:0] and C [60:0] of the full adder 15. However, full addition needs to take into account all carry propagation from the least significant digit, and therefore the number of logical stages increases, leading to an increase in the operation time.

Hence, in the LZP circuit and the LOP circuit, carry propagation is not accurately taken into account, and instead, count determination values LZP, LOP corresponding to artificial addition results obtained by implementing artificial addition taking into account the possibility of carry propagation are generated, whereupon the encoders count consecutive "1"s from the leading bit of the respective count determination values LZP, LOP. In other words, instead of taking carry propagation accurately into account, a half-added value of the count subject bit [i] is corrected on the basis of the possibility of carry propagation from the bit [i−1] one order below, whereupon LZP [i] and LOP [i] are generated. As regards the zero count determination value LZP, when the addition result S+C is "0", the encoder needs to count up LZC, and therefore the zero count determination value LZP is LZP=1 with respect to an addition result S+C of "0".

FIG. 8 illustrates, with respect to all nine combinations of S [i], S [i−1] and C [i], C [i−1], a half-added value S [i]ˆC [i], a carry-in CI [i] from bit [i−1], a value S [i]ˆC [i]ˆCI [i] of bit [i] of a fully added value obtained by adding the half-added value to the carry-in CI [i], the carry propagation possibility ˜S [i−1] & ˜C [i−1], S [i−1] & C [i−1] in the logical expressions 1 and 2 of LZP [i] and LOP [i], LZP [i], and LOP [i].

Logically, there are a total of 16 combinations of S [i], S [i−1] and C [i], C [i−1], but during addition, the augend and addend are interchangeable, and therefore duplicate combinations have been omitted, leaving nine cases CA1 to CA9 here. The interchangeability of each bit has also been taken into account. The nine cases CA1 to CA9 will be described below.

(1) When S [i−1], C [i−1] are 0, 0 (cases CA1, CA4, and CA7), there is no possibility of the carry-in CI [i] (C[i]=1) being generated. Hence, the count determination values LZP, LOP (the zero count determination value LZP and the one count determination value LOP) can be determined on the basis of S [i]ˆC [i]ˆCI [i], which is determined on the basis of the half-added value S [i]ˆC [i] in [i] and the carry-in CI [i] from [i−1].

In other words, in case CA1, S [i]ˆC [i]ˆCI [i]=0, and therefore LZP [i]=1, indicating the presence of a zero count, and LOP [i]=0, indicating the absence of a one count.

In case CA4, S [i]ˆC [i]ˆCI [i]=1, and therefore LZP [i]=0, indicating the absence of a zero count, and LOP [i]=1, indicating the presence of a one count.

Similarly, in case CA7, S [i]ˆC [i]ˆCI [i]=0, and therefore LZP [i]=1, indicating the presence of a zero count, and LOP [i]=0, indicating the absence of a one count.

(2) Next, when S [i−1], C [i−1] are 1, 1 (cases CA3, CA6, and CA9), the carry-in CI [i] is always generated. Hence, the count determination values LZP, LOP (the zero count determination value LZP and the one count determination value LOP) can be determined on the basis of S [i]ˆC [i]ˆCI [i], which is determined on the basis of the half-added value S [i]ˆC [i] in [i] and the carry-in CI [i] from [i−1].

In other words, in case CA3, S [i]ˆC [i]ˆCI [i]=1, and therefore LZP [i]=0, indicating the absence of a zero count, and LOP [i]=1, indicating the presence of a one count.

In case CA6, S [i]ˆC [i]ˆCI [i]=0, and therefore LZP [i]=1, indicating the presence of a zero count, and LOP [i]=0, indicating the absence of a one count.

Similarly, in case CA9, S [i]ˆC [i]ˆCI [i]=1, and therefore LZP [i]=0, indicating the absence of a zero count, and LOP [i]=1, indicating the presence of a one count.

In cases CA1, CA4, CA7 and cases CA3, CA6, CA9 described above, there are no errors in LZP [i] and LOP [i].

(3) When S [i−1], C [i−1] are 0, 1 or 1, 0 (cases CA2, CA5, and CA8), since only the possibility of the carry-in CI [i] (C[i]=1) being generated exists, it is impossible to determine whether a zero count or a one count is present from only two bits S [i:i−1], C [i:i−1]. In other words, when the carry rises up from the lower order digit [i−2], the carry rises up from [i−1] such that the carry-in CI [i]=1, but when the carry does not rise up from the lower order digit [i−2], the carry does not rise up from [i−1], and therefore the carry-in CI [i]=0. In the figure, therefore, the carry-in CI [i] is denoted as 0/1.

Hence, when the half-added value S [i]^C [i]=0 (CA2, CA8), carry propagation invariably stops at bit [i], and therefore bit inversion caused by carry propagation stops at bit [i]. The zero count determination value LZP and the one count determination value LOP in bit [i] may differ depending on whether carry propagation occurs from [i−1]. Therefore, LZP and LOP are set at LZP [i]=0, indicating no zero count, and LOP [i]=0, indicating no one count, so that the encoders count the count values to be small. Note, however, that when the respective counts LZC, LOC are small as a result of this logic, the counts LZC, LOC can be corrected by adding a normalization shift in accordance with error signals LZP_ERROR, LOP_ERROR generated by separate circuits, not depicted in the figures.

Meanwhile, when the half-added value is S [i]^C [i]=1 (CA5) in case of the carry-in being CI [i]=1, the carry propagates to bit [i+1], and therefore the count determinations are relegated to bit [i+1], while in bit [i], LZP [i]=1, indicating a zero count, and LOP [i]=1, indicating a one count. In other words, the possibility of the encoders counting the count values to be large (when there is no carry-in from [i−1], LZP=1 such that LZC includes a +1 error, and when there is carry-in from [i−1], LOP=1 such that LOC includes a +1 error) is allowed. Here, since the encoders count in descending order from the most significant bit [60], relegating the count determinations to bit [i+1] suggests that the count determinations are performed in bit [i+1].

In FIG. 8, underneath the nine cases CA1 to CA9, six combinations of half-added value S [i]^C [i]=0, 1 and carry-in CI [i]=0, 0/1, 1 are illustrated in association with the nine cases CA1 to CA9. Referring thereto, the logical expressions of LZP [i] and LOP [i] will be described briefly.

First, the logical expression (Expression 2) of LOP [i] is as follows.

$$\text{LOP}[i] = (S[i]{}^\wedge C[i]){}^\wedge (S[i-1] \,\&\, C[i-1]) \quad \text{Expression 2}$$

In other words, LOP [i] is an EOR of the half-added value (S [i]^C [i]) and a condition (S [i−1] & C [i−1]) on which a carry is generated based on only bit [i−1]. According to the EOR, (S [i]^C [i])=1 remains unvarying at 1 when the carry generation condition (S [i−1] & C [i−1])=0, but is inverted to 0 when (S [i−1] & C [i−1])=1. Similarly, (S [i]^C [i])=0 remains unvarying at 0 when (S [i−1] & C [i−1])=0, but is inverted to 1 when (S [i−1] & C [i−1])=1.

Further, when the carry generation condition (S [i−1] & C [i−1])=1, the carry-in CI [i] is confirmed at 1, but when (S [i−1] & C [i−1])=0, the carry-in CI [i]=0/1, and whether the carry-in CI [i] is 0 or 1 depends on whether a carry is generated from bit [i−2].

Hence, according to Expression 2 of LOP [i], in case where the half-added value is (S [i]^C [i])=0 (3 columns from the left), when the carry generation condition is (S [i−1] & C [i−1])=0, the half-added value (S [i]^C [i])=0 is not inverted in Expression 2, and therefore LOP [i]=0 (CA1 and 7 and CA2 and 8). Conversely, when (S [i−1] & C [i−1])=1, the half-added value (S [i]^C [i])=0 is inverted such that LOP [i]=1 (CA3 and 9). Note that in CA2 and 8, CI [i]=0/1, and therefore CA2 and 8 include a case in which the carry generation condition is incorrect at (S [i−1] & C [i−1])=0. In Expression 2, however, the half-added value (S [i]^C [i])=0 is not inverted by (S [i−1] & C [i−1])=0, and therefore LOP [i]=0. In other words, CA2 and 8 include a case in which LOC is counted to be small.

Further, in case where the half-added value (S [i]^C [i])=1 (3 columns from the right), when (S [i−1] & C [i−1])=0, the half-added value (S [i]^C [i])=1 is not inverted, and therefore LOP [i]=1 (CA4 and CA5). Conversely, when (S [i−1] & C [i−1])=1, the half-added value (S [i]^C [i])=1 is inverted such that LOP [i]=0 (CA6). Note that in CA5, CI [i]=0/1, and therefore CA5 includes a case in which the carry generation condition is incorrect at (S [i−1] & C [i−1])=0. In Expression 2, however, the half-added value (S [i]^C [i])=1 is not inverted by (S [i−1] & C [i−1])=0, and therefore LOP [i]=1. In other words, CA5 includes a case in which LOC is counted to be large.

Next, the logical expression (Expression 1) of LZP [i] is as follows.

$$\text{LZP}[i] = (S[i]{}^\wedge C[i]){}^\wedge ({}^\sim S[i-1] \,\&\, {}^\sim C[i-1]) \quad \text{Expression 1}$$

In other words, in LZP [i], the half-added value (S [i]^C [i]) is identical to that of LOP [i], but the half-added value (S [i]^C [i]) is set as an EOR with a carry non-generation condition (~S [i−1] & ~C [i−1]). The reason for this is that, in contrast to LOP, LZP is used to determine leading zeros.

In other words, in Expression 1, in case where the half-added value (S [i]^C [i])=0 (3 columns from the left), when the carry non-generation condition (~S [i−1] & ~C [i−1])=1, the half-added value=0 is inverted such that LZP [i]=1 (zeros) (CA1 and 7). When the carry non-generation condition CS [i−1] & ~C [i−1])=0, on the other hand, the half-added value=0 is not inverted, and therefore LZP [i]=0 (no zeros) (CA2 and 8, and CA3 and 9). In CA2 and 8, LZC may be counted to be small.

Conversely, in case where the half-added value (S [i]^C [i])=1 (3 columns from the right), when the carry non-generation condition (~S [i−1] & ~C [i−1])=1, the half-added value=1 is inverted such that LZP [i]=0 (CA4). When the carry non-generation condition CS [i−1] & ~C [i−1])=0, on the other hand, the half-added value=1 is not inverted, and therefore LZP [i]=1 (zeros) (CA5 and 6). In CA5, LZC may be counted to be large.

Next, the reason why, in case CA5, a problem generally does not occur even when LZP [i]=LOP [i]=1 such that LZC and LOC are counted to be large will be described.

FIG. 9 is a diagram illustrating relationships between three examples of the one count determination value LOP and the leading one count LOC. Note that these relationships are similar for the zero count determination value LZP and the leading zero count LZC. In the figure, bits [i+1], [i], and [i−1] of the three examples (1), (2), and (3) correspond to CA5, CA5, and CA2/8, in order from the lower order side. The reason for this is that when [i] corresponds to CA5, [i+1] corresponds to one of CA2, CA5, and CA8 with respect to both LOP and LZP. This can be ascertained from the fact that, in nine combinations in FIG. 8, in CA5, S [i], C [i]=0, 1, and therefore, [i+1] could only to CA2, CA5, and CA8 due to S [i−1], C [i−1]=0, 1. In other words, in a case where [i] corresponds to CA5, [i+1] corresponds to CA5 when the carry is propagated from [i−1], and [i+1] corresponds to either CA2 or CA8 when the carry is not propagated from [i−1]. Hence, when carry propagation from the lower order bit occurs continuously, CA5 is established continuously, and when carry propagation from [i−1] is interrupted, CA5 in [i] becomes either CA2 or CA8 in [i+1].

As described above, in CA2 and CA8, LOP and LZP=0 such that LOC and LZC are not counted, whereas in CA5, LOP and LZP=1 such that LOC and LZC are counted.

LOC and LZC are respectively obtained by counting consecutive instances of LOP=1 and LZP=1 from the upper order bit, and therefore, when CA2 or CA8 is established in [i+1] such that LOP=0 and LZP=0, the counts are terminated. As a result, when the bits [i], [i−1] on the lower order side of [i+1] correspond to CA5, LOP=1 and LZP=1 in CA5 are not counted to LOC and LZC. In other words, LOP=1 and LZP=1, at which an error may be included in [i] and [i−1] of CA5, do not affect LOC and LZC when CA2 or CA8 in [i+1]. On the other hand, the error of LOP=1 and LZP=1, at which an error may be included in [i] and [i−1] of CA5, continues to affect LOC and LZC when CA5 in [i+1].

As illustrated in FIGS. 6 and 7, therefore, LOC and LZC are obtained by counting LOP, LZP=1 in descending order of the bits on the lower order side of bit [60], in which a valid bit may be embedded, and when LOP, LZP=0, the counts are terminated. In the light of this matter, the three examples (1), (2), and (3) illustrated in FIG. 9 will be considered.

In example (3), when bit [60] corresponds to CA2 or CA8, LOP and LZP=0, and therefore the counts of LOC and LZC are terminated, whereby the predicted left shift amount LSA is 0. In examples (1) and (2), bit [60] corresponds to CA5, and therefore LOC and LZC are counted up by counting LOP, LZP=1 of CA5 in [60:58], whereby the predicted left shift amount LSA is 3.

In example (2), however, bit [61] corresponds to either CA2 or CA8 (in actuality, S [61], C [61]=00, and therefore CA2), and therefore, the LOC and LZC counts would normally be terminated here, with the result that an erroneous value of 3 is obtained as the counted values LOC and LZC of LOP, LZP=1 of CA5 in [60:58]. In example (1), bit [61] corresponds to CA5, and therefore a non-erroneous value of 3 is obtained as the counted values LOC and LZC of LOP, LZP=1 of CA5 in [60:58].

Hence, when CA5 occurs continuously up to the most significant bit, this means the counted values LOC and LZC of LOP=1, LZP=1 corresponding to CA5 are correct. CA5 in bit [i] means that it is only possible to determine whether or not an error is included by confirming whether or not CA5 propagates to [i+1] or upward.

Analysis of a Case When LZC/LOC Correction is Needed

In this embodiment, cases in which an error is included in LOP, LZP are extracted from among all of the possible combinations of S, C, and CI, as illustrated in nine combinations in FIG. 8, the cases in which an error is included in LOP, LZP are narrowed down on the basis of limitations of the data format of FIG. 3, and an appropriate LOC, LZC correction circuit is proposed.

The left shift amount prediction circuit 17 of FIGS. 5, 6 and 7, instead of predicting the left shift amount LSA on the basis of the addition result ADD1 of the full adder 15, determines LZP [i] and LOP [i] for each bit [i] using the logical operations of Expressions 1 and 2, which are executed in relation to the inputs S, C of the full adder 15, and counts LZP [i]=1 and LOP [i]=1 from the most significant bit [60]. In the logical operation expressions 1 and 2, determinations are made from only the inputs S and C of the target bit [i] and the lower bit [i−1], thereby eliminating the need to wait for carry propagation from the least significant digit. As a result, the speed of the operation to predict the normalization shift amount (the left shift amount) can be increased.

However, the counted values of LZC and LOC may become small or large depending on whether or not carry propagation occurs from the lower order bit [i−2], as in cases CA2, CA5, and CA8 of FIG. 9. When an error in which the counted values of LZC and LOC are small occurs, as in CA2 and CA8, the normalization shift can be corrected by executing an additional left shift using the normalization shift circuit in accordance with the error signal LZP_ERROR. However, when an error in which the counted values of LZC and LOC are large occurs, as in CA5, the normalization shift circuit does not include a right shift circuit, and therefore an LZC, LOC correction circuit of some kind is needed.

Possibility of Error in Leading Zero Count LZC and Leading One Count LOC Relating to Input Pattern of Zero Count Determination Value LZP and One Count Determination Value LOP As illustrated in FIG. 9, the presence or absence of an error in the leading zero count LZC and the leading one count LOC is determined by analyzing the possibility of an error in LZP [60] and LOP [60] in the most significant bit [60]. For this purpose, all combinations of S [60:59], C [60:59] in bits [60] and [59] and the carry-in CI [59] based on S [58], C [58] in bit [58] may be analyzed, the possibility of an error in LZC, LOC may be extracted, and an LZC/LOC correction circuit may be considered.

FIG. 10 is a diagram illustrating LOP and LZP according to all 32 combinations of S [60:59], C [60:59] in bits [60] and [59] and the carry-in CI [59] in bit [59], and the fully added value ADD1 (the RES of RESULT) obtained by the full adder 15. Here, the fully added value RES (=ADD1) is RES=S [60:59]+C [60:59]+CI [60:59]. LZP and LOP are determined from Expressions 1 and 2, described above, and Expressions 1 and 2 are also depicted in FIG. 10.

According to FIG. 10, when RES [60]=0 but LZP [60]=0, as in columns 2 and 5 of the top row, LZC is counted to be small, which corresponds to CA2 in FIG. 8. Further, when RES [60]=1 but LZP [60]=1, as in columns 4 and 7 of the top row, LZC is counted to be large, which corresponds to CA5 in FIG. 8.

When RES [60]=1 but LZP [60]=1, as in columns 2 and 5 of the second row, LZC is counted to be large, which corresponds to CA5 in FIG. 8. Further, when RES [60]=0 but LZP [60]=0, as in columns 4 and 7 of the second row, LZC is counted to be small, which corresponds to CA8 in FIG. 8.

When RES [60]=1 but LOP [60]=0, as in columns 2 and 5 of the third row, LOC is counted to be small, which corresponds to CA2 in FIG. 8. Further, when RES [60]=0 but LOP [60]=1, as in columns 4 and 7 of the third row, LOC is counted to be large, which corresponds to CA5 in FIG. 8.

When RES [60]=0 but LOP [60]=1, as in columns 2 and 5 of the fourth row, LOC is counted to be large, which corresponds to CA5 in FIG. 8. Further, when RES [60]=1 but LOP [60]=0, as in columns 4 and 7 of the fourth row, LOC is counted to be small, which corresponds to CA8 in FIG. 8.

Hence, according to FIG. 10, it can be seen that cases in which an error occurs in LZP and LOP include (A) cases in which LZP, LOP are determined to equal 0 when LZP, LOP need to equal 1 such that LZC and LOC are counted to be small, as in CA2 and CA8, and (B) cases in which LZP, LOP are determined to equal 1 when LZP, LOP need to equal 0 such that LZC and LOC are counted to be large, as in CA5.

In this case, (A) cases in which LZC and LOC are counted to be small (CA2, CA8) occur when RES [60:59]=10 or 01, and since CA2 and CA8 do not occur in consecutive bits, or in other words since carry propagation from the lower order bit always stops at bit [60], LZC and LOC are merely counted to be small by 1 at most. This type of error can be corrected by having the normalization shift circuit (the left shift circuit) implement another left shift in response to an error signal, and does not therefore pose a problem.

However, (B) cases in which LZC and LOC are counted to be large (CA5) are not able to be corrected by having the normalization shift circuit implement a left shift, and therefore a new right shift circuit needs to be provided for the purpose of correction. Accordingly, instead of providing a right shift circuit, the error is preferably corrected using an LZC/LOC prediction circuit. Hereafter, therefore, with respect to (B) cases in which LZC and LOC are counted to be large (CA5), patterns to be corrected are narrowed down in accordance with input pattern limitations of FIG. 3.

FIG. 11 is a diagram illustrating (B) cases in which LZC and LOC are counted to be large (CA5), extracted from FIG. 10. Note that the inputs S and C of the adder CSA are interchangeable, and are therefore substantially duplicated in columns 1 and 4 and columns 2 and 3 in FIG. 11. Further, the inputs S and C in bits [i] and [i−1] are likewise interchangeable, and are therefore duplicated in all of columns 1-4 in FIG. 11. Nevertheless, in the following analysis, these eight cases will be considered.

Next, data patterns in the multiplication addition circuit will be considered on the basis of the data format of the formatted operands OP1, OP2, OP3.

Patterns of Outputs SUM, CRY of Wallace Tree 12
(i.e. Inputs of CSA 14)

The data format of FIG. 3 is compatible with normalized and subnormal numbers, which are floating point numbers, and integers, while LZC is used to predict the shift amount of the left shift (normalization shift) performed on a floating point number operation result. Hence, the input pattern of the Wallace tree 12 can be limited to a floating point number. As a result, the input pattern of the Wallace tree (the pattern following formatting of OP1, OP2) is limited to [31:28]= 0001 or 0000.

Therefore, the added value SUM+CRY of the outputs SUM and CRY of the Wallace tree (the multiplication result of OP1 and OP2) is either normalized number*normalized number (0001*0001=0000001), normalized number*subnormal number (0001*0000=00000001), or subnormal number*subnormal number (0000*0000), thereby guaranteeing the following.

Guarantee 1: [63:57]=0000001 or 0000000

In other words, at least the following is guaranteed in relation to the output pattern SUM+CRY of the Wallace tree.

Guarantee 2: [63:58]=000000

Output Pattern of Input Shift Circuit RSFT

When the input of the right shift circuit RSFT is also limited to a floating point number, the input is limited to [31:28]=0001 or 0000. As illustrated in FIG. 4, when the selector SEL1 selects the upper order side 64 bits SEL_OUT_H, the normalization shift circuit 18 executes a left shift on the basis of the right shift amount RSA, and when the selector SEL1 selects the lower order side 64 bits SEL_OUT_L, the normalization shift circuit 18 executes a left shift on the basis of the LZC/LOC predicted shift amount LSA.

Therefore, the LZC/LOC predicted shift amount LSA is used when the lower order side 64 bit SEL_OUT_L of FIG. 4 is selected, and in this case, the third operand OP3 [28] is shifted right to or below bit [60] by the right shift circuit RSFT. In other words, the right shift circuit RSFT shifts the number of the third operand right by at least 32 bits.

Furthermore, TRUE_ADD and TRUE_SUB determinations are implemented on the basis of the sign of the first and second operands OP1, OP2 and the sign of the third operand OP3. More specifically, TRUE_ADD corresponds to a case in which multiplication addition is performed on the basis of the multiplication result and the sign of the addition operand OP3, while TRUE_SUB corresponds to a case in which multiplication/subtraction is performed on the basis of the multiplication result and the sign of the addition operand OP3.

In the case of TRUE_SUB, a minimum right shift amount is controlled to 32 bits, and in the case of TRUE_ADD, the minimum right shift amount is controlled to 33 bits.

The reason for this is that in the case of TRUE_ADD, 1 in bit [60] may be modified to 0 in the full adder 15 due to carry (carry-in) from the lower order side, with the result that 1 is obtained in bit [61]. In this case, the numbers from bit [60] downward may be misread. In the case of TRUE_ADD, therefore, the minimum right shift amount is set at 33 bits, i.e. 1 bit larger than that of TRUE_SUB, in order to control the position of the hidden bit following the right shift to the position of bit [59].

Hence, the minimum right shift amount in the case of TRUE_ADD is 33, and therefore at least the following is guaranteed.

Guarantee 3: RSFT_OUTPUT [63:60]=0000

Further, the minimum right shift amount in the case of TRUE_SUB is 32, and therefore at least the following is guaranteed.

Guarantee 4: RSFT_OUTPUT [63:61]=000

Pattern of Wallace Tree Output+RSFT Output,
Pattern of Output RES of ADDER

Next, a case in which Wallace tree output+RSFT output=output RES of ADDER and output S+C of CSA 14=upper order bit RES [63:58] of RES will be considered.

The addition result RES of the Wallace tree output and the output of the RSFT is as follows.

RES[63:58]={SUM[63:58]+CRY[63:58]+(CO of SUM+CRY[57:0])[58]}+{RSFT[63:58]+(CO od RSFT[57:0])[58]}

As indicated above in Guarantee 2, in relation to the result of SUM+CRY, [63:58]=000000 is guaranteed, and therefore the following is obtained.

{SUM[63:58]+CRY[63:58]+(SUM+CRY[57:0]CO)[58]}=000000

Hence, the two above expressions can be arranged as follows.

RES[63:58]=RSFT[63:58]+CO[58] of RSFT[57:0]

Here, the CO [58] of the RSFT [57:0] is generated only when CI=1 is added to the least significant bit in a case where a complement is implemented (a 2's complement is formed) in the case of TRUE_SUB, while in the case of TRUE_ADD, the CO [58] of the RSFT [57:0] is always 0. Accordingly, the following is obtained.

In the case of TRUE_ADD, CO [58] from RSFT [57:0]=0
In the case of TRUE_SUB, CO [58] from RSFT [57:0]=1

Hence, in accordance with Guarantees 3 and 4 described above, the following is obtained.

Guarantee 3: In the case of TRUE_ADD, RSFT_OUTPUT [63:58]=0000xx
Guarantee 4: In the case of TRUE_SUB, RSFT_OUTPUT [63:58]=000xxx When the RSFT_OUTPUT [63:58] of Guarantees 3 and 4 and the CO [58] of the RSFT [57:0] are inserted into RES [63:58], the following is guaranteed in relation to the upper order bit RES [63:58] of the CSA output S+C=RES.

Guarantee 5: In the case of TRUE_ADD, RES [63:60]= 0000
Guarantee 6: In the case of TRUE_SUB, RES [63:60]= 111 or 000

In TRUE_SUB, 000 is generated in a case where inversion occurs due to the carry from the lower order.

When an Error is Present in LZC and When an Error is Present in LOC

FIG. 12 is a diagram illustrating, respectively in an upper part and a lower part of the figure, a case in which an error may occur in LZC and a case in which an error may occur in LOC with respect to FIG. 11. Accordingly, the possibility of LZC being selected will be considered below in relation to the patterns depicted on the upper side, in which an error may occur in LZC.

When an Error is Present in LZC

In FIG. 5, the condition on which the selector SEL2 selects LZC is as follows.

LZC_SEL=~TRUE_SUB+CO*HI0

On the right side of the above expression, the first term ~TRUE_SUB does not indicate subtraction, and therefore, in the case of addition, or in other words when TRUE_ADD=1, LZC_SEL=1. As regards the second term CO*HI0, when CO [63]=1 and HI0=1, CO*HI0=1 such that LZC_SEL=1.

Hence, regarding the first term on the right side, when ~TRUE_SUB=TRUE_ADD=1, RES [63:60]=0000 is guaranteed in accordance with Guarantee 5 as long as TRUE_ADD=1, but all of the four cases on the LZC side in FIG. 12 have RES [60]=1 and do not correspond to a case of TRUE_ADD=1.

Next, regarding the second term on the right side, when CO*HI0=1, CO [63]=1 means that a carryout is generated from the full adder 15, and high zero HI0=1 means that the upper order bit of the input of the CO adder 16 is complemented to ALL "1". Hence, from HI0=1 and CO [63]=1, the upper order bit of the output ADD2 of the CO adder 16 becomes ALL "0", whereby the selector SEL1 selects the lower order side 64 bits. In other words, the result of subtracting the addition operand OP3 from the multiplication result is positive.

Looking at the four cases on the LZC side of FIG. 12, therefore, a carryout is not generated in bit [60], and it is therefore obvious that CO [63]=0. Hence, the condition of the second term is CO*HI0=0.

As a result, both the first term and the second term on the right side of LZC_SEL are 0, and therefore LZC_SEL is invariably 0. Hence, LZC is not selected, and it is therefore evident that there is no need to correct the error in LZC.

When an Error is Present in LOC

Next, patterns in which an error may occur in LOC in FIG. 12 will be considered. In FIG. 5, the condition on which the selector SEL2 selects LOC as the shift amount LSA of the LSFT is as follows.

LOC_SEL=TRUE_SUB*~CO

Here, TRUE_SUB indicates subtraction, while ~CO negates carryover CO [63] from the full adder 15. In other words, the condition on which LOC is selected corresponds to subtraction and CO [63]=0. When TRUE_SUB=1 and CO [63]=0, this means that carryover is not generated during subtraction by the full adder, and therefore the subtraction result is negative.

In the case of TRUE_SUB, the following is guaranteed with respect to the output RES [63:61] of the full adder 15 in accordance with Guarantee 6 described above.

Guarantee 6: RES [63:61]=111 or 000
Accordingly,

RES[63:61]=S[63:61]+C[63:61]+CI[61]=111 or 000

Meanwhile, in all of the four patterns in which an error may occur in LOC in FIG. 12, CI [61]=1, and therefore, by inserting CI [61]=1 into the above expression, the following expression is obtained.

RES[63:61]=S[63:61]+C[63:61]+1=111 or 000

By transforming the expression, the following expression is obtained.

S[63:61]+C[63:61]=110 or 111

Here, considering a case in which S [63:61]+C [63:61]= 111, in all of the combinations of S, C, and CI in the four patterns on the lower side of FIG. 12, CI [61]=1, and therefore 111 is inverted to 000, whereby CO [63]=1 is generated. In this case, in the above condition LOC_SEL=TRUE_SUB*~CO for selecting LOC, ~CO=0, whereby LOC_SEL=0, and therefore the condition for selecting LOC is not established.

In other words, when RES [63:61]=000 during subtraction, carryover CO [63]=1 is generated such that the subtraction result is positive, and as a result, LOC is not selected.

Considering a case in which S [63:61]+C [63:61]=110, meanwhile, combinations of S [63:61] and C [63:61] for satisfying this expression exist in eight patterns illustrated in FIG. 13.

FIG. 13 is a diagram illustrating the eight patterns of S [63:61] and C [63:61] for satisfying S [63:61]+C [63:61]= 110. The eight patterns correspond respectively to cases in which S [63:61]+C [63:61]=6+0, 5+1, 4+2, 3+3, 2+4, 1+5, 0+6, and 7+7 (in decimal notation).

Here, the eight patterns of the output S [63:61] and C [63:61] of the CSA, as illustrated in FIG. 13, are narrowed down on the basis of the guarantees (Guarantee 2 and Guarantee 4) provided by the CSA input patterns.

First, in a case where TRUE_SUB=1, the following is obtained in accordance with Guarantee 4.

Guarantee 4: RSFT [63:61]=111

Further, the following is obtained in accordance with Guarantee 2.

Guarantee 2: SUM [63:58]+CRY [63:58]=000000

FIG. 14 is a diagram illustrating patterns of the CSA inputs SUM, CRY and RSFT for satisfying Guarantee 4 and Guarantee 2, as described above. In FIG. 14, SUM and CRY are interchangeable, and are even interchangeable in the same bit. Therefore, to avoid duplication, interchangeable combinations have been omitted. RSFT is also interchangeable with SUM and CRY, but is differentiated from SUM, CRY in FIG. 14. Combinations of SUM and CRY in six patterns P_a to P_f constitute combinations satisfying Guarantee 2. Further, bit [60] of RSFT may be either 0 or 1, and is therefore marked with "x". Hence, in the pattern P_f, RSFT [60]=x (undetermined), and therefore C [60]=x (undetermined). Furthermore, the outputs S, C of the CSA are indicated in each of the six patterns.

The combination that is duplicated in the six combinations of the outputs S, C of the CSA in FIG. 14 and the eight combinations of the outputs S, C of the CSA satisfying S [63:61]+C [63:61]=110, as illustrated in FIG. 13, is the pattern P_f.

A lower section of FIG. 14 depicts patterns P_f0 and P_f1 obtained by separating RSFT in the pattern P_f into RSFT [60]=0 and 1. It can be seen that of the two patterns P_f0 and P_f1 in the lower section, the combination that is duplicated in the combinations of FIG. 13 is the pattern P_f0.

The pattern P_f0 includes the inputs SUM, CRY, and RSFT input into the CSA, and the outputs S, C of the CSA. Therefore, by determining either the combination of the inputs SUM, CRY, RSFT of the CSA in bit [60] or the combination of the outputs S, C of the CSA in bit [61], the pattern P_f0 can be distinguished from the other patterns.

To distinguish the pattern P_f0 using the combination of the inputs SUM, CRY, RSFT of the CSA in bit [60] (SUM [60], CRY [60], RSFT [60]=100 or 010), the following discriminant is employed.

$P\_f0 = (SUM[60]\char`\^CRY[60]) \& {\sim}RSFT[60]$      Discriminant 10

Here, SUM and CRY may switch places, and therefore SUM and CRY are obtained by specifying combinations of 0/1 and 1/0 by means of an EOR.

To distinguish the pattern P_f0 using the combination of the outputs S, C of the CSA in bit [61] (S [61], C [61]=00), meanwhile, the following discriminant is employed.

$P\_f0 = {\sim}S[61] \& {\sim}C[61] = {\sim}(S[61]+C[61])$      Discriminant 11

In other words, the pattern P_f0 can be distinguished using a circuit that generates a correction flag FLAG=1 indicating a correction enabled state when the result of an AND operation executed in relation to ~S [61] and ~C [61] or a NOR operation executed in relation to S [61] and C [61] is true (=1).

LZC, LOC Correction Circuit Used When LZP and LOP Are Erroneous

FIG. 15 is a diagram in which the pattern P_f0 of FIG. 14 is applied to the four (LOC) patterns of FIG. 12. As illustrated in FIGS. 5 and 6, LOP is generated from bit [60] downward, and LOC is incremented by 1 from LOP [60]. Accordingly, FIG. 15 illustrates an example in which an error of LOP=1 occurs in bit [60] such that LOP [60]=1.

According to the patterns in FIG. 15, the multiplication addition result RES [60]=0, and therefore the one count determination would normally be LOP [60]=0. When LOP [60]=0, the count value LOC of the encoder is LOC=0 in accordance with LOP [60]=0. Therefore, LOC correction processing may take the form of processing for obtaining LOC=0. The following are examples of correction processing for obtaining LOC=0.

Correcting LOP[60] to LOP[60]=0      (1)

Correcting LOC[5:0] to LOC[5:0]=0      (2)

When Discriminant 10 or Discriminant 11 is satisfied, the correction processing of either (1) or (2) may be executed. For this purpose, a circuit that generates the correction flag FLAG=1 indicating the correction enabled state when Discriminant 10 or Discriminant 11 is satisfied may be provided, and either a one count determination value correction circuit for setting LOP [60] at LOP [60]=0 or a one count value correction circuit for setting LOC [5:0] at LOC [5:0]=0 when the correction flag FLAG=1 may be provided. By providing these circuits, LOC and LZC can be corrected appropriately in a case where LOP, LZP=1 may be an error. As noted above, however, a case in which LZP=1 may be an error and a case in which LZC is selected do not occur simultaneously. Therefore, it is good that LOP [60] or LOC [5:0] is corrected appropriately in the correction enabled state, in which Discriminant 10 or Discriminant 11 is satisfied, in a case where LOP=1 may be an error (i.e. in case CA5).

A logical expression for generating the correction flag FLAG is an AND of the condition TRUE_SUB=1 of LOC_SEL=1, which serves as a prerequisite, and either Discriminant 10 or Discriminant 11 for distinguishing the pattern P_f0. Accordingly, the logical expression for generating the correction flag FLAG is as follows.

FLAG=TRUE_SUB & $P\_f0$=TRUE_SUB & {(SUM[60]^CRY[60])&~RSFT[60]}      FLAG determination 1 or

=TRUE_SUB &(~$S$[61]&~$C$[61])=TRUE_SUB &~($S$[61]+$C$[61])      FLAG determination 2

In the first embodiment, illustrated in FIGS. 1 and 5, the correction flag FLAG is generated when the correction determination circuit CRCT_1 satisfies FLAG determination 2, whereupon a zero mask circuit ZERO_M serving as a one count correction circuit performs an operation to correct the one count LOC [5:0] to zero. The zero mask circuit ZERO_M serves as a one count value correction circuit. Further, the correction determination circuit CRCT_1 illustrated in FIG. 5 has an AND arithmetic unit for ~S [61] and ~C [61]. The arithmetic unit may also be a NOR arithmetic unit for S [61] and C [61]. Note that when the selector SEL2 selects LOC, TRUE_SUB=1, and therefore TRUE_SUB=1 is not distinguished by the correction determination circuit CRCT_1 of FIG. 5.

As noted above, means for modifying LOP [60] to LOP [60]=0 may also be employed as means for correcting LOC [5:0] to LOC [5:0]=0. When means for modifying LOP [60] to LOP [60]=0 is employed, a gate ZERO M2 (an identical gate to a zero mask ZERO_M illustrated in FIG. 5) that zero-masks the output LOP [60] of the LOP circuit within the LOC circuit of FIG. 6 using the correction flag FLAG may be provided. In other words, a gate circuit of LOP [60]=FLAG & LOP [60] may be provided.

Second Embodiment

Figure 16:
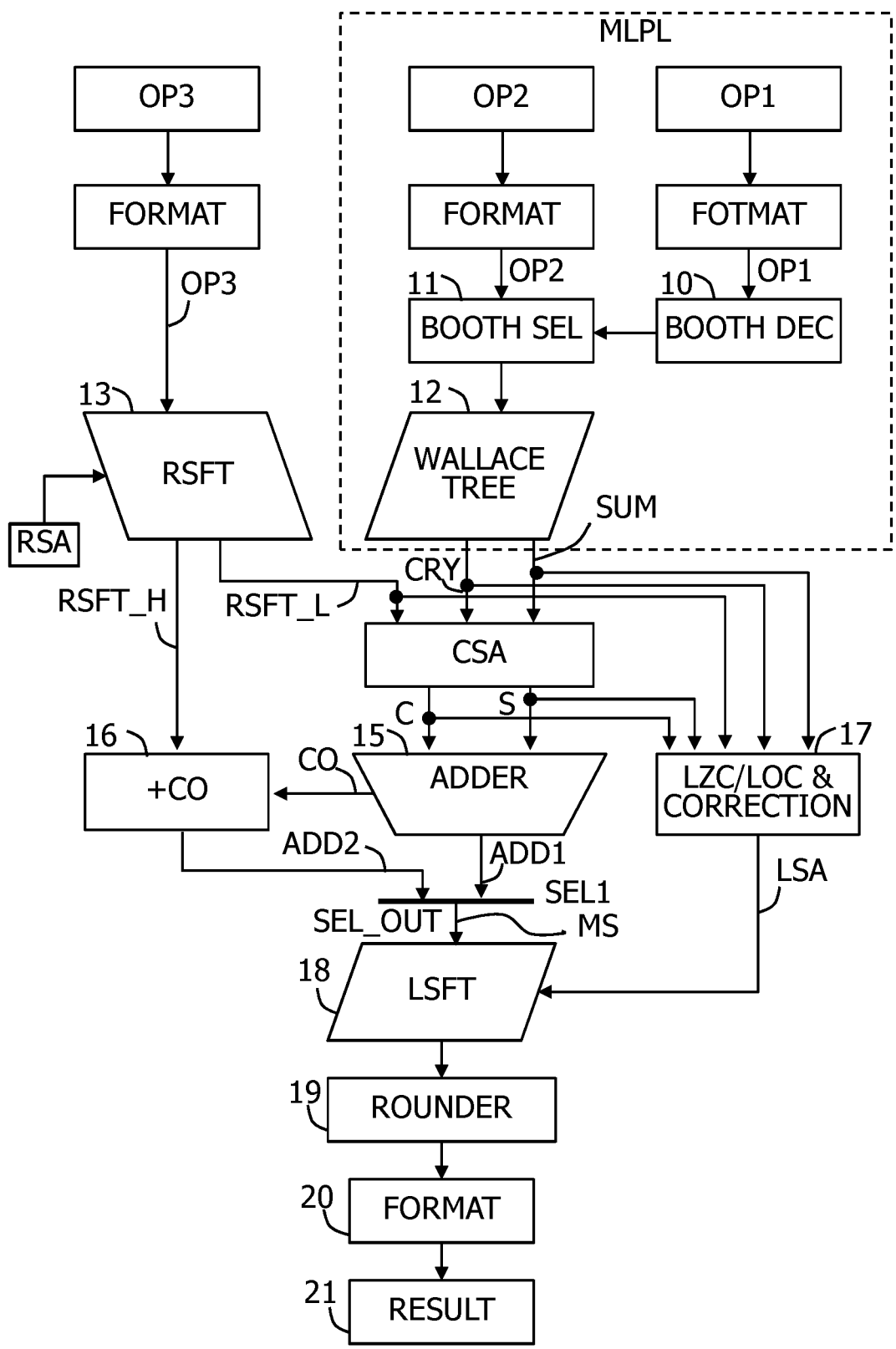
FIG. 16 is a diagram illustrating a multiplication addition circuit serving as an example of an arithmetic circuit according to a second embodiment.

FIG. 16 is a diagram illustrating a multiplication addition circuit serving as an example of an arithmetic circuit according to a second embodiment. In the multiplication addition circuit according to the second embodiment, the left shift amount prediction circuit 17 corrects, according to the FLA determination 1, the normalization shift amount LSA on the basis of the input of the CSA 14, namely the outputs SUM and CRY of the Wallace tree 12 and the output RSFT_L of the right shift circuit 13, in addition to the inputs S, C of the full adder 15. This configuration differs from that of the multiplication addition circuit according to the first embodiment, illustrated in FIG. 1. In the second embodiment, similarly to the first embodiment, the left shift amount prediction circuit 17 predicts LZC and LOC on the basis of the input of the full adder 15, or in other words the outputs S, C of the CSA.

Figure 17:
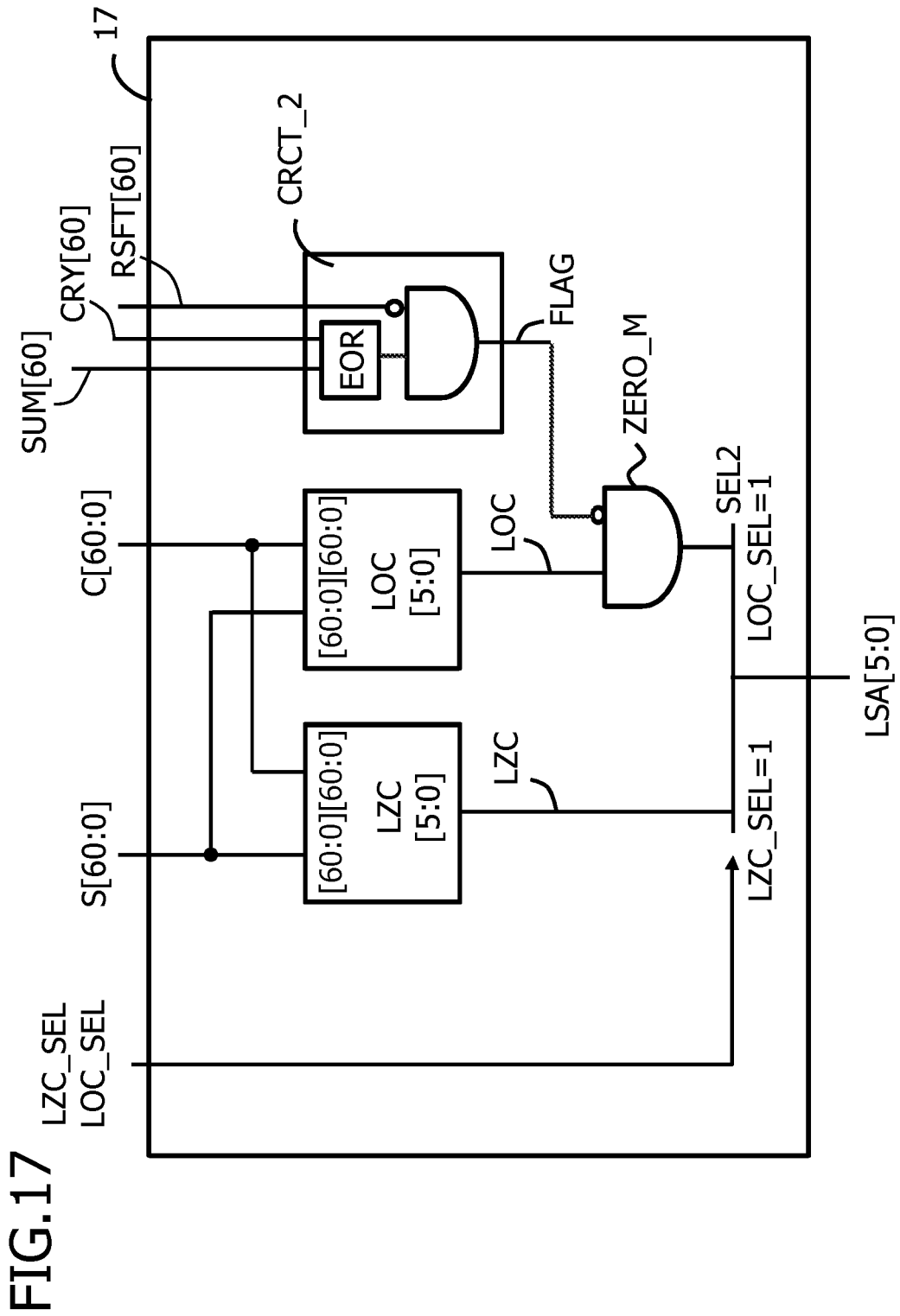
FIG. 17 is a diagram illustrating an example configuration of the left shift amount prediction circuit 17 according to the second embodiment.

FIG. 17 is a diagram illustrating an example configuration of the left shift amount prediction circuit 17 according to the second embodiment. In the figure, the LZC circuit and the LOC circuit are identical to FIG. 5. Meanwhile, a correction determination circuit CRCT_2 receives the inputs SUM [60], CRY [60], and RSFT [60] of the CSA as input, and generates the correction flag FLAG. The correction determination circuit CRCT_2 generates the correction flag FLAG by calculating an EOR of SUM [60] and CRY [60] and calculating an AND of the EOR output and an inversion signal of RSFT [60]. In response to the correction flag FLAG, the one count correction circuit ZERO_M corrects the one count LOC to 0.

As noted in the first embodiment, means for modifying LOP [60] to LOP [60]=0 may also be employed as means for correcting LOC to LOC=0. When means for modifying LOP [60] to LOP [60]=0 is employed, a gate (an identical gate to ZERO_M in FIG. 5) that zero-masks the output LOP [60] of the LOP circuit within the LOC circuit of FIG. 17 using the correction flag FLAG may be provided. In other words, a gate circuit of LOP [60]=~FLAG & LOP [60] may be provided.

According to the first and second embodiments, as described above, an LOC correction circuit for correcting an LOC count value of an LOC circuit can be constructed from simple circuits.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An arithmetic unit comprising:
    a multiplier that converts a floating point format of a first input and a second input in a first operand and a second operand into an internal format in which M (where M is a plurality) most significant bits are set at 0 and N (where N is a plurality) lower order bits following the most significant bits constitute a fraction, and then multiplies the first input and the second input to output a multiplication result;
    an adder that converts a floating point format of a third input in a third operand into the internal format, and adds the third input to the multiplication result to output a multiplication addition result;
    a normalization shift circuit for shifting the multiplication addition result left on the basis of a left shift amount; and
    a left shift amount prediction circuit for predicting the left shift amount,
    wherein
    the adder includes:
        a carry-save adder that adds a first addition value and a first carry value, which together serve as the multiplication result, to the third input; and
        a full adder that adds together a second addition value and a second carry value output by the carry-save adder to output the multiplication addition result, and
    the left shift amount prediction circuit includes:
        a leading zero count circuit that generates a zero count determination value for each bit from the N lower order bits of the second addition value and the second carry value, and generates a leading zero count, which is a number of true zero count determination values occurring consecutively in descending order from an upper order bit side;
        a leading one count circuit that generates a one count determination value for each bit from the N lower order bits of the second addition value and the second carry value, and generates a leading one count, which is a number of true one count determination values occurring consecutively in descending order from the upper order bit side; and
        a correction circuit that corrects the leading one count to zero in a correction enabled state where a NOR of a respective least significant bit of the M upper order bits of the second addition value and the second carry value is true.

2. An arithmetic unit comprising:
    a multiplier that converts a floating point format of a first input and a second input in a first operand and a second operand into an internal format in which M (where M is a plurality) most significant bits are set at 0 and N (where N is a plurality) lower order bits following the most significant bits constitute a fraction, and then multiplies the first input and the second input to output a multiplication result;
    an adder that converts a floating point format of a third input in a third operand into the internal format, and adds the third input to the multiplication result to output a multiplication addition result;
    a normalization shift circuit for shifting the multiplication addition result left on the basis of a left shift amount; and
    a left shift amount prediction circuit for predicting the left shift amount,
    wherein
    the adder includes:
        a carry-save adder that adds a first addition value and a first carry value, which together serve as the multiplication result, to the third input; and
        a full adder that adds together a second addition value and a second carry value output by the carry-save adder to output the multiplication addition result, and
    the left shift amount prediction circuit includes:
        a leading zero count circuit that generates a zero count determination value for each bit from the N lower order bits of the second addition value and the second carry value, and generates a leading zero count, which is a number of true zero count determination values occurring consecutively in descending order from an upper order bit side;
        a leading one count circuit that generates a one count determination value for each bit from the N lower order bits of the second addition value and the second carry value, and generates a leading one count, which is a number of true one count determination values occurring consecutively in descending order from the upper order bit side; and
        a correction circuit that corrects the leading one count to zero in a correction enabled state where an AND of an EOR of a respective most significant bit of the N lower order bits of the first addition value and the first carry value and a NOT of a most significant bit of the N lower order bits of the third input is true.

3. The arithmetic unit according to claim 1, wherein the correction circuit includes a leading one count correction circuit that modifies the leading one count that is output by the leading one count circuit to zero in the correction enabled state.

4. The arithmetic unit according to claim 2, wherein the correction circuit includes a leading one count correction circuit that modifies the leading one count that is output by the leading one count circuit to zero in the correction enabled state.

5. The arithmetic unit according to claim 1, wherein the correction circuit includes a leading one count determination value correction circuit that modifies a most significant bit of the N lower order bits of the one count determination value to false in the correction enabled state.

6. The arithmetic unit according to claim 2, wherein the correction circuit includes a leading one count determination value correction circuit that modifies a most significant bit of the N lower order bits of the one count determination value to false in the correction enabled state.

7. The arithmetic unit according to claim 1, wherein
the adder further includes an input shift circuit that aligns digits of the third input converted into the internal format with digits of the multiplication result, and
an output of the input shift circuit is input into the carry-save adder.

8. The arithmetic unit according to claim 2, wherein
the adder further includes an input shift circuit that aligns digits of the third input converted into the internal format with digits of the multiplication result, and
an output of the input shift circuit is input into the carry-save adder.

9. The arithmetic unit according to claim 1, wherein
the multiplier includes a Booth decoder that decodes the first input converted into the internal format, and a Wallace tree circuit that adds together partial products of the second input converted into the internal format, the partial products corresponding to a decoded value obtained by the Booth decoder, and
the Wallace tree circuit outputs the first addition value and the first carry value.

10. The arithmetic unit according to claim 2, wherein
the multiplier includes a Booth decoder that decodes the first input converted into the internal format, and a Wallace tree circuit that adds together partial products of the second input converted into the internal format, the partial products corresponding to a decoded value obtained by the Booth decoder, and
the Wallace tree circuit outputs the first addition value and the first carry value.

11. A control method for controlling an arithmetic unit comprising:
by a multiplier, converting a floating point format of a first input and a second input in a first operand and a second operand into an internal format in which M (where M is a plurality) most significant bits are set at 0 and N (where N is a plurality) lower order bits following the most significant bits constitute a fraction, and multiplying the first input and the second input to output a multiplication result;
by an adder, converting a floating point format of a third input in a third operand into the internal format, and adding the third input to the multiplication result to output a multiplication addition result;
by a normalization shift circuit, shifting the multiplication addition result left on the basis of a left shift amount; and
by a left shift amount prediction circuit, predicting the left shift amount,
wherein
the adding by the adder includes:
by a carry-save adder, adding a first addition value and a first carry value, which together serve as the multiplication result, to the third input; and
by a full adder, adding together a second addition value and a second carry value output by the carry-save adder to output the multiplication addition result, and
the predicting by the left shift amount prediction circuit includes:
by a leading zero count circuit, generating a zero count determination value for each bit from the N lower order bits of the second addition value and the second carry value, and generating a leading zero count, which is a number of true zero count determination values occurring consecutively in descending order from an upper order bit side;
by a leading one count circuit, generating a one count determination value for each bit from the N lower order bits of the second addition value and the second carry value, and generating a leading one count, which is a number of true one count determination values occurring consecutively in descending order from the upper order bit side; and
by a correction circuit, correcting the leading one count to zero in a correction enabled state where a NOR of a respective least significant bit of the M upper order bits of the second addition value and the second carry value is true.

* * * * *